(12) United States Patent
Bronstein et al.

(10) Patent No.: US 10,013,653 B2
(45) Date of Patent: Jul. 3, 2018

(54) SYSTEM AND A METHOD FOR LEARNING FEATURES ON GEOMETRIC DOMAINS

(71) Applicant: Università della Svizzera italiana, Lugano (CH)

(72) Inventors: Michael Bronstein, Lugano (CH); Davide Boscaini, Lugano (CH); Jonatan Masci, Como (IT); Pierre Vandergheynst, Ecublens (CH)

(73) Assignee: UNIVERSITÀ DELLA SVIZZERA ITALIANA, Lugano (CH)

( * ) Notice: Subject to any disclaimer, the term of this patent is extended or adjusted under 35 U.S.C. 154(b) by 0 days.

(21) Appl. No.: 15/006,694

(22) Filed: Jan. 26, 2016

(65) Prior Publication Data

US 2017/0213381 A1 Jul. 27, 2017

(51) Int. Cl.
*G06T 15/00* (2011.01)
*G06N 3/08* (2006.01)
*G06F 17/10* (2006.01)
*G06T 19/00* (2011.01)

(52) U.S. Cl.
CPC ............. *G06N 3/08* (2013.01); *G06F 17/10* (2013.01); *G06T 19/00* (2013.01)

(58) Field of Classification Search
CPC .................................. G06T 15/10; G06N 3/08
See application file for complete search history.

(56) References Cited

U.S. PATENT DOCUMENTS

| | | | | |
|---|---|---|---|---|
| 6,081,605 | A * | 6/2000 | Roth | G06K 9/3241 |
| | | | | 382/103 |
| 6,476,803 | B1 * | 11/2002 | Zhang | G06T 15/00 |
| | | | | 345/419 |
| 8,918,352 | B2 * | 12/2014 | Deng | G06N 3/08 |
| | | | | 382/157 |
| 9,600,892 | B2 * | 3/2017 | Patel | G06T 7/11 |
| 2003/0061200 | A1 * | 3/2003 | Hubert | G06F 17/30011 |
| 2007/0047802 | A1 * | 3/2007 | Puri | G06K 9/4628 |
| | | | | 382/157 |
| 2007/0189627 | A1 * | 8/2007 | Cohen | G06K 9/00228 |
| | | | | 382/254 |
| 2007/0237419 | A1 * | 10/2007 | Shechtman | G06K 9/00335 |
| | | | | 382/278 |
| 2008/0238919 | A1 * | 10/2008 | Pack | G06T 15/04 |
| | | | | 345/420 |

(Continued)

OTHER PUBLICATIONS

Bruna, Joan et al. "Spectral Networks and Deep Locally Connected Networks on Graphs," *Proceedings of the 2nd International Conference on Learning Representations*, pp. 1-14, 2013.

(Continued)

*Primary Examiner* — Martin Mushambo
(74) *Attorney, Agent, or Firm* — Saliwanchik, Lloyd & Eisenschenk

(57) ABSTRACT

A method for extracting hierarchical features from data defined on a geometric domain is provided. The method includes applying on said data at least an intrinsic convolution layer, including the steps of applying a patch operator to extract a local representation of the input data around a point on the geometric domain and outputting the correlation of a patch resulting from the extraction with a plurality of templates. A system to implement the method is also described.

40 Claims, 14 Drawing Sheets

(56) References Cited

U.S. PATENT DOCUMENTS

| | | | |
|---|---|---|---|
| 2009/0204558 A1* | 8/2009 | Weston | G06N 3/08 706/20 |
| 2011/0170781 A1* | 7/2011 | Bronstein | G06K 9/6289 382/190 |
| 2011/0182469 A1* | 7/2011 | Ji | G06K 9/00335 382/103 |
| 2011/0222724 A1* | 9/2011 | Yang | G06K 9/00248 382/103 |
| 2011/0276314 A1* | 11/2011 | Orderud | A61B 6/503 703/1 |
| 2012/0075302 A1* | 3/2012 | Cai | G06T 9/001 345/420 |
| 2013/0093768 A1* | 4/2013 | Lockerman | G06T 11/001 345/428 |
| 2013/0223694 A1* | 8/2013 | Ricanek, Jr. | G06K 9/00221 382/118 |
| 2014/0193076 A1* | 7/2014 | Gardiner | G06K 9/46 382/190 |
| 2015/0100530 A1* | 4/2015 | Mnih | G06N 3/0454 706/25 |
| 2015/0112182 A1* | 4/2015 | Sharma | A61B 5/0261 600/408 |
| 2015/0139485 A1* | 5/2015 | Bourdev | G06K 9/00362 382/103 |
| 2015/0221131 A1* | 8/2015 | Luo | G06T 17/20 345/419 |
| 2015/0248608 A1* | 9/2015 | Higgins | G06N 3/04 706/16 |
| 2015/0278634 A1* | 10/2015 | Kato | G06K 9/4628 382/197 |
| 2015/0324655 A1* | 11/2015 | Chalasani | G06K 9/6272 382/103 |
| 2015/0347819 A1* | 12/2015 | Yin | G06K 9/00221 382/118 |
| 2015/0347820 A1* | 12/2015 | Yin | G06K 9/00221 382/118 |
| 2016/0027208 A1* | 1/2016 | Pham | G06T 17/005 382/103 |
| 2016/0202844 A1* | 7/2016 | He | G06F 3/017 345/175 |
| 2016/0232715 A1* | 8/2016 | Lee | G06T 19/006 |

OTHER PUBLICATIONS

Litman, Roee et al. "Learning Spectral Descriptors for Deformable Shape Correspondence," *IEEE Transactions on Pattern Analysis and Machine Intelligence*, 36(1), pp. 171-180, 2014.

Rodolà, Emanuele et al. "Dense Non-Rigid Shape Correspondence using Random Forests," *Proc. of the IEEE Conference on Computer Vision and Pattern Recognition (CVPR)*, pp. 1-8, 2014.

Su, Hang et al. "Multi-view Convolutional Neural Networks for 3D Shape Recognition," *Proc. of the IEEE International Conference on Computer Vision (ICCV)*, pp. 1-9, 2015.

Wei, Lingyu et al. "Dense Human Body Correspondences Using Convolutional Networks," Published in: arXiv:1511.05904, pp. 1-11, 2015.

Wu, Zhirong et al. "3D ShapeNets: A Deep Representation for Volumetric Shapes," *The IEEE Conference on Computer Vision and Pattern Recognition (CVPR)*, pp. 1912-1920, 2015.

* cited by examiner

SYSTEM AND A METHOD FOR LEARNING FEATURES ON GEOMETRIC DOMAINS

BACKGROUND

As is known, methods and systems implemented in computer vision to process images, extracting hierarchical features from data, are not currently applicable with the same results in domains such as computer graphics, where 3D shapes (manifolds) need to be processed, or computational sociology, dealing with networks (graphs).

Deep learning methods have recently significantly impacted many domains. Nowadays, deep learning methods are already widely used in commercial applications, including Siri speech recognition in Apple iPhone, Google text translation, and Mobileye vision-based technology for autonomously driving cars.

Deep learning refers to learning complicated concepts by a machine, by means of building them out of simpler ones in a hierarchical or "multi-layer" manner. Artificial neural networks are a popular realization of such deep multi-layer hierarchies inspired by the signal processing done in the human brain. Though these methods have been known since the late 1960s, the computational power of modern computers, availability of large datasets, and efficient stochastic optimization methods have led to creating and effectively training complex network models that have made a qualitative breakthrough in performance.

Computer vision perhaps has been affected most dramatically by deep learning. Traditional approaches in this domain relied on "hand-crafted" axiomatic or empirical models. It appeared that constructing axiomatic models for increasingly complex concepts is nearly impossible, while at the same time, the growth of publicly available image data allowed "modeling by example". Simply put, while it is hard to determine what makes a dog look like a dog, one can get millions examples of dog images and use a sufficiently complex generic model to learn the "dog model" from the data. The work of Krizhevsky et al., achieving unprecedented performance ImageNet benchmark in 2012, has provoked a sharp resurgence of interest in deep learning methods. Deep learning methods have been since applied to practically any problem in computer vision, almost invariably outperforming the previous approaches. Overall, this sequence of successes has brought on an overwhelming trend in the community to abandon "hand-crafted" models in favor of deep learning methods.

Among the key reasons for the success of deep neural networks are important assumptions on the statistical properties of the data, namely stationarity and compositionality through local statistics, which are present in natural images, video, and speech. From the geometric perspective, one can think of such signals as functions on the Euclidean space (plane), sampled on a grid. In this case, stationarity is owed to shift-invariance, locality is due to the local connectivity, and compositionality stems from the multi-resolution structure of the grid. These properties are exploited by convolutional neural networks (CNNs), which are built of alternating convolutional and downsampling (pooling) layers. The use of convolutions allows extracting local features that are shared across the image domain and greatly reduces the number of parameters in the network with respect to generic deep architectures, without sacrificing the expressive capacity of the network. The parameters of different layers are learned by minimizing some task-specific cost function.

Dealing with signals such as speech, images, or video on 1D-, 2D- and 3D Euclidean domains, respectively, has been the main focus of research in deep learning for the past decades. However, in recent years, more and more fields have had to deal with data residing on non-Euclidean geometric domains (referred to here as geometric data for brevity).

For instance, in social networks, the characteristics of users can be modeled as signals on the vertices of the social graph. In genetics, gene expression data are modeled as signals defined on the regulatory network. In computer graphics and vision, 3D shapes are modeled as Riemannian manifolds (surfaces) endowed with properties such as color texture or motion field (e.g. dynamic meshes). Even more complex examples include networks of operators, such as functional correspondences or difference operators in a collection of 3D shapes, or orientations of overlapping cameras in multi-view vision ("structure from motion") problems. Furthermore, modeling high-dimensional data with graphs is an increasingly popular trend in general data science, where graphs are used to describe the low-dimensional intrinsic structure of the data.

On the one hand, the complexity of geometric data and availability of large datasets (in the case of social networks, on the order of billions of examples) make it tempting and very desirable to resort to machine learning techniques. On the other hand, the non-Euclidean nature of such data implies that there are no such familiar properties as global parametrization, common system of coordinates, vector space structure, or shift-invariance. Consequently, basic operations such as linear combination or convolution that are taken for granted in the Euclidean case, are even not well defined on non-Euclidean domains.

This happens to be a major obstacle that so far has precluded the use of successful deep learning methods such as convolutional or recurrent neural networks on non-Euclidean geometric data. As a result, the quantitative and qualitative breakthrough that deep learning methods have brought into speech recognition, natural language processing, and computer vision has not yet come to fields such as computer graphics or computational sociology. Given the great success of CNNs in computer vision, devising a non-Euclidean formulation of CNNs could lead to a breakthrough in many fields wherein data reside on non-Euclidean domains.

Many machine learning techniques successfully working on images were tried "as is" on 3D geometric data, represented for this purpose in some way "digestible" by standard frameworks. In particular, several prior art methods applied traditional Euclidean CNNs for shape classification, where the 3D geometric structure of the shapes was represented as a set of range images or a rasterized volume. The main drawback of such approaches is their treatment of geometric data as Euclidean structures. First, for complex 3D objects, Euclidean representations such as depth images or voxels may lose significant parts of the object or its fine details, or even break its topological structure. Second, Euclidean representations are not intrinsic, and vary due to pose or deformation of the object. Achieving invariance to shape deformations, a common requirement in many vision applications, is extremely hard with the aforementioned methods and requires huge training sets due to the large number of degrees of freedom involved in describing non-rigid deformations.

Referring to FIG. 1, an application of volumetric CNN to a deformable shape is illustrated. A cylinder shape 1, to which a non-rigid deformation is applied, is depicted. A 4×4×4 3D filter 3a (represented with cubes) constituting part of the volumetric CNN is applied at point 2 on the cylinder 1 before the deformation, and the 3D filter 3b is applied at the same point 2 after the deformation, and these are different. Darkened cubes represent the elements of the filter that correlate with the shape 1. It is evident from FIG. 1 that different filters have to be applied to the cylinder 1 and its deformed version.

For more abstract geometric data, such as graphs or networks, a Euclidean representation may not exist at all. One therefore has to generalize signal processing and learning methods to graphs, a research field generally referred to as signal processing on graphs.

Traditional signal processing has been developed primarily for linear shift-invariant (LSI) systems, which naturally arise when dealing with signals on Euclidean spaces. In this framework, which dates back to the first computers and is based on mathematics that is several centuries old, basic filtering operations can be represented as convolutions, linear shift-invariant operators. The fundamental property that convolution operators are diagonalized in the Fourier basis on Euclidean domains (colloquially known as the "Convolution Theorem"), together with fast numerical algorithms for Fourier transform computation (FFT), have been the main pillar of signal and image processing in the late part of the 20th century.

Spectral analysis techniques were extended to graphs considering the orthogonal eigenfunctions of the Laplacian operator as a generalization of the Fourier basis. Constructions such as wavelets, short-time Fourier transforms, or algorithms such as dictionary learning originally developed for the Euclidean domain, were also generalized to graphs.

Bruna et al. employed a spectral definition of "convolution", where filters are defined by their Fourier coefficients in the graph Laplacian eigenbasis. In classical signal processing in Euclidean spaces, by virtue of the Convolution Theorem, the convolution of two functions can be computed in the frequency domain as a product of their respective Fourier transforms:

$$f*g = \mathcal{F}^{-1}(\mathcal{F}f \cdot \mathcal{F}g),$$

where $\mathcal{F}$, $\mathcal{F}^{-1}$ denote the forward and inverse Fourier transforms, respectively, $f$, $g$ are some functions, and * denotes the convolution operation. On a graph, the convolution may be defined by the above formula, where the Fourier transform is understood as projection on the graph Laplacian eigenbasis. This method is designed to work on a single graph; a spectral model learned on one graph is in general not transferable to another one, since the filters are expressed with respect to a basis that is graph-specific (even for isometric graphs, the Laplacian eigenbases are defined up to sign).

Referring to FIG. 2, an example illustrating the difficulty of generalization across non-Euclidean domains is shown. A function defined on a human shape 4 (function values are represented by color shades) undergoes edge-detection filtering in the frequency domain resulting in function 5. The same filter applied on the same function but on a different (nearly-isometric) shape 6 produces a completely different result.

Generally speaking, this seems to be a common plight of most existing methods for signal processing and learning on graphs, which should be more appropriately referred to as "signal processing and learning on a graph". While at a first glance this seems to be a subtle difference, for machine learning algorithms, the generalization ability is a key requirement.

BRIEF SUMMARY

The present invention deals with the problem of how to improve and successfully use deep learning methods, such as convolutional neural networks, on non-Euclidean geometric data, including coping with shape non-rigid and elastic deformations or transferring the CNN model learned on one graph to another graph, thus overcoming all the limitations currently affecting the prior art methods.

The solution at the base of the present invention is to adapt convolutional neural networks to general geometric domains, more particularly to non Euclidean domains, by using the intuition of convolution as "correlation with template". According to this idea, the notion of a "patch" is applied to non-Euclidean geometric domains, i.e. to a continuous (topological) space that has a local (non-Euclidean) metric structure, for instance Riemannian manifolds and graphs.

In the light of this idea, the applicant has identified a specific method for extracting "patches" in the non-Euclidean geometric domains which is described herein. The method may be applied also to Euclidean domains, which constitute a particular case of non-Euclidean domains.

On the basis of this solution, the technical problem mentioned above is solved by a method for extracting hierarchical features from data defined on a geometric domain, comprising applying on said data at least an intrinsic convolution layer, including the steps of applying a patch operator to extract a local representation of the input data around a point on the geometric domain and outputting the correlation of a patch resulting from the extraction with a plurality of templates.

More advantageously, correlation with the local representation extracted at each points of the data defined on the non-Euclidean domain may be optimized depending on a task specific application or cost function, for instance optimizing certain parameters of the intrinsic convolution layer if a first task specific application or cost function on said data is required, such as shape retrieval, or optimizing certain other parameters of the intrinsic convolution layer if a second task specific application or cost function such as shape correspondence on said data is required.

Data are defined in the geometric domain X as functions, on which the patch operator is applied. The geometric domain may include, for example, a manifold, a parametric surface, an implicit surface, a mesh, a point cloud, and/or a graph. All these domains may be non-Euclidean domains.

Besides applying the patch operator, one or more optional layers can be applied to data, including:
- a linear layer or fully connected layer, including outputting a weighted linear combination of input data;
- a non-linear layer, including applying a non-linear function to input data;
- a spatial pooling layer, including:
  - determining a subset of points on the geometric domain;
  - for each point of said subset, determining the neighbors on the geometric domain; and
  - computing an averaging operation on input data over the neighbors for all the points of said subset;
- a covariance layer, including computing a covariance matrix of input data over all the points of the geometric domain;

wherein each layer has input data and output data and output data of one layer are given as input data to another layer.

The averaging operation may be an arithmetic average or a maximum operation or an average weighted by weights dependent on a distance between points or an average weighted by weights dependent on local volume elements.

According to an aspect of the invention, two or more layers are applied in sequence, and the output data of one layer in the sequence is given as input data to a subsequent layer in the sequence. Preferably, more than one of the layers is applied and the parameters of the applied layers are determined by minimizing the task specific application or cost function by means of an optimization procedure.

The patch operator inputs data on geometric domain and a point on said domain, and outputs the local representation of said data around the point. For instance, the local representation is:
- data represented in a local intrinsic polar system of coordinates or
- data transformed by a windowed Fourier transform or
- data weighted by anisotropic diffusion kernels.

Any one of such local representation is adapted to be applied to the intrinsic convolution layer to extract hierarchical features of data, also when such data are defined on a non-Euclidean domain, and the hierarchical features extracted may be optimized depending on the cost function.

In one aspect of the invention the patch operator outputs the local representation of input data in the local intrinsic polar system of coordinates, and an origin of angular coordinates of the local intrinsic polar system of coordinates is provided as side information extracted from the geometric domain or the data.

More particularly, the geometric domain may be a surface and the side information used to determine the origin of the angular coordinate of the local intrinsic polar system of coordinates at each point on the surface may be a principal curvature direction at said point.

The side information used to determine the origin of the angular coordinate of the local intrinsic polar system of coordinates at each point may be, in alternative or in addition, a direction of a minimal or maximal absolute change of the data at said point.

Alternatively, the patch operator outputs the local representation of input data in the local intrinsic polar system of coordinates and a Fourier transform is applied with respect to angular coordinates, followed by an absolute value operation.

The application of the intrinsic convolution layer includes applying the patch operator to extract the local representation of input data in the local intrinsic polar system of coordinates around the point on the geometric (including non-Euclidean) domain, and outputting the correlation of the patch resulting from the extraction with a plurality of templates, wherein the computation of said correlation further comprises the steps of:
- rotating each template along angular coordinates;
- computing the correlation of the patch with the rotated template; and
- taking a maximum operation over all the rotations.

The patch operator may include the following features.

The representation of input data in the local polar system of coordinates around the point on the geometric domain further comprises the steps of:
- computing an intrinsic distance from the point to all the other points on the geometric domain;
- computing level sets of the intrinsic distance at a plurality of levels;
- splitting a full angle at the point into a plurality of angular directions; and
- shooting rays emanating from the point along said directions perpendicular to the level sets.

According to an aspect of the present invention, the intrinsic distance is defined as one of the following distances or an approximation thereof:
- a geodesic distance;
- a diffusion distance;
- a commute time distance; or
- a biharmonic distance.

The local representation of data in input to the intrinsic convolution layer may further comprise the steps of:
- computing weights localized around level sets and rays; and
- computing weighted averages of input data with each of the weights.

According to another aspect of the present invention, the intrinsic convolution layer may be based on a localized frequency analysis. In this case, the local representation of data may be given by a windowed Fourier transform. The windowed Fourier transform may be computed on the input data comprising the steps of:
- computing localized modulated atoms; and
- computing inner products of data with the localized modulated atoms.

In particular, the localized modulated atoms are heat kernels multiplied by Laplacian eigenfunctions. Advantageously, the heat kernels can be anisotropic.

According to a further aspect of the present invention, the computation of local representation of input data around the point on the geometric domain may comprise the steps of:
- computing a plurality of directed anisotropic heat kernels at said point, corresponding to a plurality of anisotropy constants and directions; and
- computing weighted averages of input data with the directed anisotropic heat kernels.

As explained above, the intrinsic convolution layer may be applied to optimize a cost function which may depend on an application. Accordingly, the method of the present invention is adapted to extract hierarchical features on data defined on a geometric domain and an optimization procedure is defined to optimize a cost function depending on the application for which hierarchical features are extracted, for instance extracting hierarchical features which better describe shape correspondence when the application concern matching a shape with another shape or extracting hierarchical features which better describe shape retrieval when the application is searching the most similar shape to the given one in a database.

A plurality of cost functions is defined, and each of the cost functions is associated to one or more application for which feature extraction is carried out. Advantageously, the intrinsic convolutional layer and the method of the present invention are not changed when the application changes, just the cost function adapted to the application is selected.

In an aspect of the invention, the input into the optimization procedure is a training set comprising:
- a positive set of pairs of points on one or more geometric domains; and
- a negative set of pairs points on one or more geometric domains;

wherein two identical copies of the hierarchical system configured with the same parameters are fed with pairs of points from the positive and negative sets, and wherein the optimization procedure tries to minimize the distance between the outputs corresponding to positive pairs and maximize the distance between the outputs corresponding to negative pairs.

According to the solution idea given above, the technical problem at the base of the present invention is also solved by a system for implementing the method for extracting hierarchical features. The system comprises:
- means to define data on a geometric domain and means for applying at least an intrinsic convolution layer, including the means for applying a patch operator to extract a local representation of the input data around a point on the geometric domain and outputting the correlation of a patch resulting from the extraction with a plurality of templates.

Preferably, the system comprises means for further applying one or more of the following layers on the data:
- an intrinsic convolution layer, to apply a patch operator for extracting a local representation of the data around a point on the geometric domain and to correlate a patch, resulting from the extraction, with a plurality of templates;
- a linear layer (or fully connected layer), to take said data in input and to give in output a weighted linear combination;
- a non-linear layer, to take said data in input into a non-linear function;
- a spatial pooling layer, to determine neighbors of a point on the geometric domain and to compute an averaging operation over the neighbors; and/or
- a covariance layer, to compute a covariance matrix of said data in input over all the points of the geometric domain.

The geometric domain wherein data is defined in the system can be one of the following:
- a manifold;
- a parametric surface;
- a mesh;
- a point cloud; or
- a graph.

Preferably, the means for applying layers are configured to apply more than one layer. The system includes an optimization procedure to minimize a cost function to determine parameters of the layers to be applied. The cost function may be selected based on an application for which the hierarchical features are extracted.

The patch operator is defined in the system as one or more of the following:
- local polar system of coordinates;
- windowed Fourier transform; and/or
- anisotropic diffusion kernels.

The patch operator is configured to output the local representation of input data in the local intrinsic polar system of coordinates, and to provide an origin of angular coordinates of the local intrinsic polar system of coordinates as side information extracted from the geometric domain or the data.

The system may be configured to take a surface as a geometric domain and to a take a principle curvature direction at the point as the side information used to determine the origin of the angular coordinate of the local intrinsic polar system of coordinates at each point on the surface.

The system may be configured to take a direction of a minimal or maximal absolute change of the data at the point as the side information used to determine the origin of the angular coordinate of the local intrinsic polar system of coordinates at each point.

The patch operator may be configured to output the local representation of input data in the local intrinsic polar system of coordinates, and to apply the Fourier transform with respect to angular coordinates, followed by an absolute value operation.

The means to apply the intrinsic convolution layer are configured to apply the patch operator to extract a local representation of input data in a local intrinsic polar system of coordinates around a point on the geometric domain, and to output the correlation of a patch resulting from the extraction with a plurality of templates, and are further configured for
- rotating each template along angular coordinates;
- computing the correlation of the patch with the rotated template; and/or
- taking a maximum operation over all the rotations.

The means to apply the intrinsic convolution layer are further configured for:
- computing an intrinsic distance from the point to all the other points on the geometric domain;
- computing level sets of the intrinsic distance at a plurality of levels;
- splitting a full angle at the point into a plurality of angular directions; and/or
- shooting rays emanating from the point along said directions perpendicular to the level sets.

The intrinsic distance is one of the following or an approximation thereof:
- geodesic distance;
- diffusion distance;
- commute time distance; or
- biharmonic distance.

The means to apply the intrinsic convolution layer are further configured for
- computing weights localized around level sets and rays; and/or
- computing weighted averages of input data with each of said weights.

The means to apply the intrinsic convolution layer are further configured for computing the windowed Fourier transform of input data by:
- computing localized modulated atoms; and
- computing inner products of data with said atoms.

The localized modulated atoms are isotropic or anisotropic heat kernels multiplied by Laplace-Beltrami eigenfunctions.

The means to apply the intrinsic convolution layer are further configured for the computation of local representation of input data around a point on geometric domain by
- computing a plurality of directed anisotropic heat kernels at the point, corresponding to a plurality of anisotropy constants and directions; and
- computing weighted averages of input data with the directed anisotropic heat kernels.

According to an aspect of the invention, the averaging operation is one or more of the following:
- an arithmetic average;
- a maximum operation;
- an average weighted by weights dependent on a distance between points; and/or
- an average weighted by weights dependent on local volume elements.

Advantageously, a plurality of cost functions may be optimized by the system, and each cost functions is associated with one or more application for which features may be extracted.

According to the optimization procedure, the system may take in input a training set, comprising:
- a positive set of pairs of points on one or more geometric domains; and
- negative set of pairs points on one or more geometric domains;

wherein two identical copies of the hierarchical system configured with the same parameters are fed with pairs of points from said positive and negative sets, and wherein the optimization procedure tries to minimize the distance between the outputs corresponding to positive pairs and maximize the distance between the outputs corresponding to negative pairs.

Advantageously, the system may be used for different applications including determining similarity between two geometric objects or determining correspondence between objects from a class of geometric objects and a reference object.

Further features and advantages of the method and system of the present invention are given in the following description, with reference to the annexed drawings for exemplary purposes and without limiting the scope of protection of the present invention.

DETAILED DISCLOSURE

According to the idea of solutions given above, methods are hereafter described for extracting hierarchical features from data defined on a geometric domain using an intrinsic convolutional neural network endowed with, at least, one intrinsic convolution layer, according to the present invention. The methods are described with reference to the annexed drawings, provided for exemplary purposes only and without limiting the scope of the present invention.

The intrinsic convolution layer of the method of the present invention differs from the convolution layer of related art convolutional neural networks by the kind of domains onto which it is applicable. In particular, the convolution layer of related art neural networks is restricted to domains that can be modeled as Euclidean spaces (images, audio signals, etc.). Advantageously, the intrinsic convolution layer of the method of the present invention is adapted to deal with a wider category of domains that can be modeled as non-Euclidean spaces.

Figure 1:
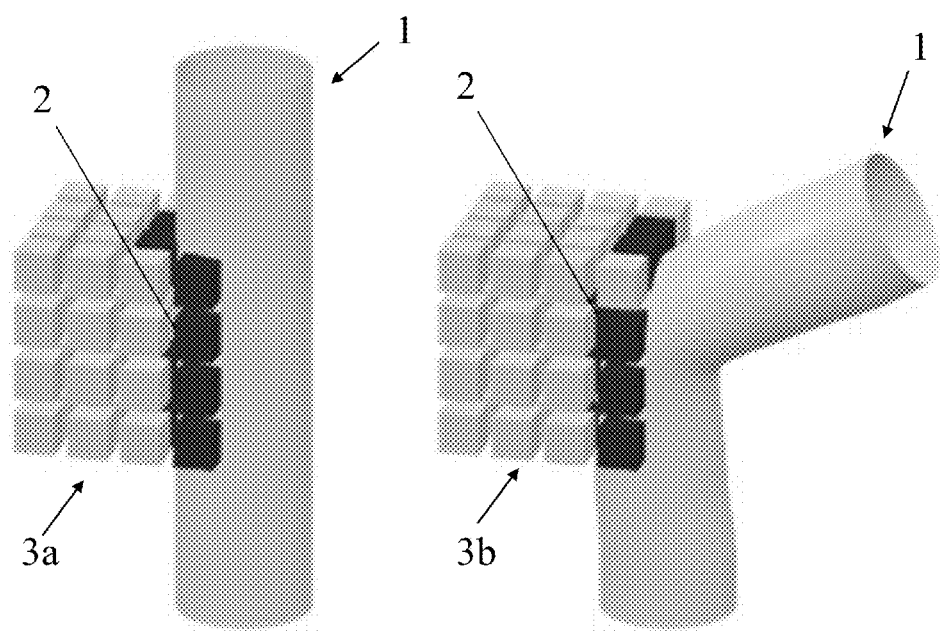
FIG. 1 represents the application of 3D filters on a cylinder before and after a deformation, according to a method of the prior art.
Figure 2:
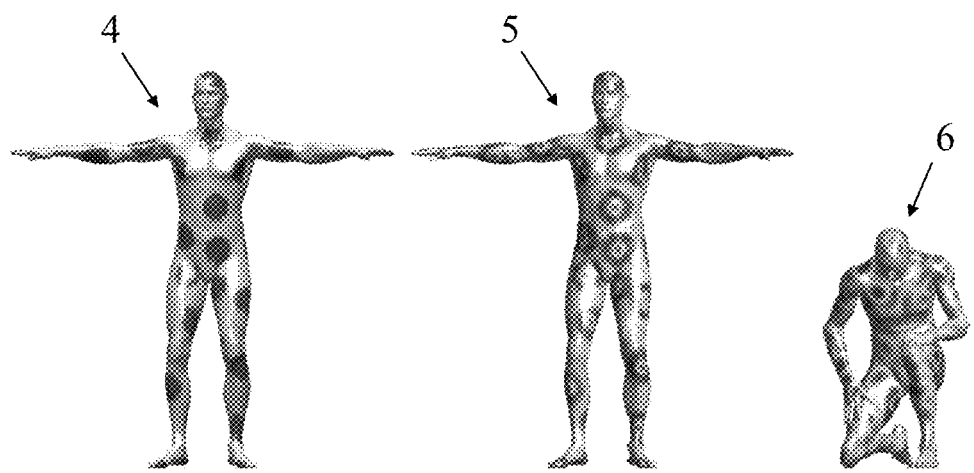
FIG. 2 represents the inability of spectral convolutional networks proposed in the prior art to generalize the model learned on one domain to another domain.
Figure 3:
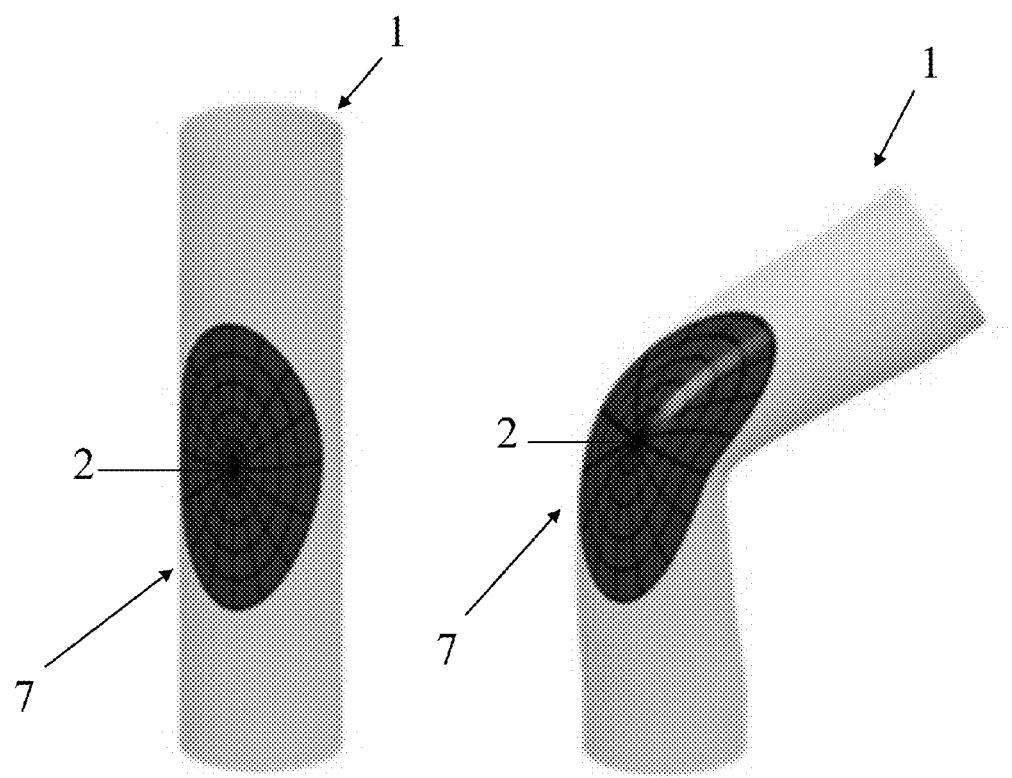
FIG. 3 represents the application of a patch on the cylinder of FIG. 1, according to a method of the present invention.

Advantageously, the methods of the subject invention work at an intrinsic level: the patch operator according to the present invention is defined on the geometric domain itself, as opposed to related art methods using a Euclidean representation (embedding) of non-Euclidean domains. For instance, FIG. 3 schematically shows such advantages in the case where the geometric domain is represented as a cylinder 1 and the deformation is non-rigid: the patch 7 around a point 2 on the cylinder 1 follows the deformation, making the patch invariant to such deformations. In other words, the patch of the invention is intrinsic.

Hereafter, definitions of geometric domain, data defined on the geometric domain, patch operator, correlation with templates and intrinsic convolutional neural network according to the methods of the present invention are given.

Figure 4A:
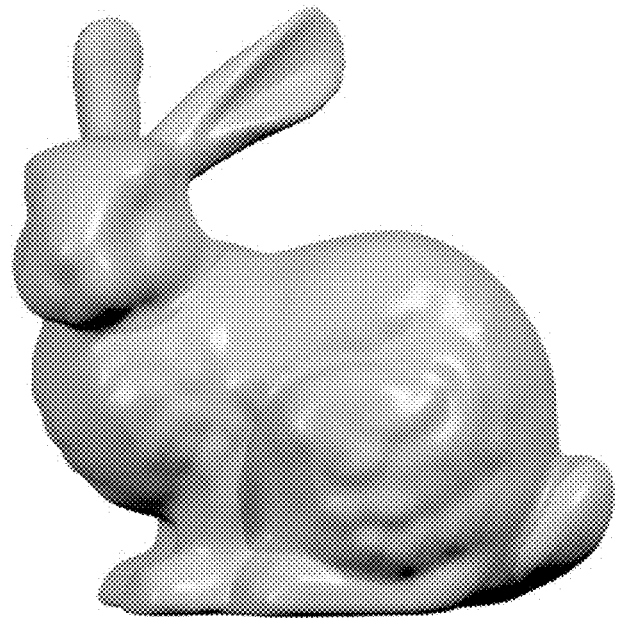
FIGS. 4A and 4B schematically represent a geometric domain in the form of a 3D shape and a geometric domain in the form of a graph, respectively.
Figure 4B:
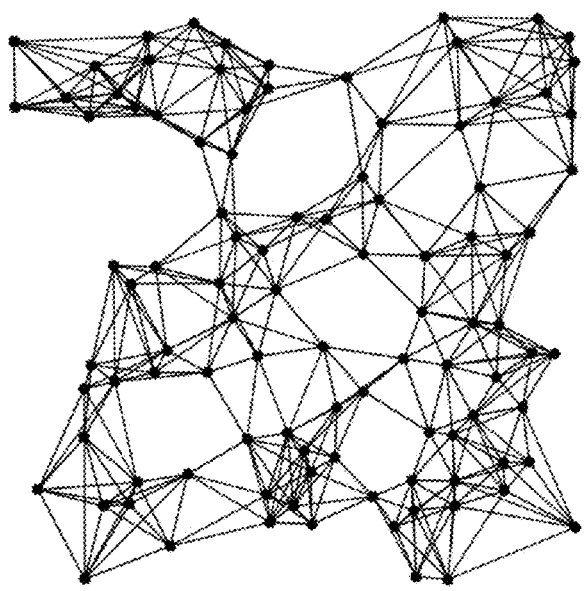

A geometric domain is a non-Euclidean space. Therefore, the meaning of the two expressions in the following description is the same. Geometric domains include, but are not limited to, manifolds and graphs. FIG. 4A shows an example of a manifold, and FIG. 4B shows an example of a graph.

An m-dimensional manifold X is a topological space that is locally homeomorphic (topologically equivalent) to a m-dimensional Euclidean space, referred to as the tangent space. For example, the Earth (spherical surface) is locally equivalent to a plane. Additionally, the manifold X can be endowed with an inner product on the tangent space (referred to as Riemannian metric $g_x$), which provides for a way to measure intrinsic distances on the manifold. In this case X is referred to as a Riemannian manifold.

What is commonly known as "three-dimensional (3D) shapes" in computer graphics and vision can be modeled as two-dimensional (2D) manifolds (surfaces), embedded in the 3D Euclidean space. The term 2D in this case refers to the intrinsic dimensionality of the manifold, and 3D to the (extrinsic) dimensionality of the embedding space.

More generally, an M-dimensional manifold embedded in a D-dimensional Euclidean space (D>M) can be represented through a parametrization $y=f(x_1, \ldots, x_M)$, $f:\Omega \subseteq \mathbb{R}^M \to \mathbb{R}^D$, where $\Omega$ represents the parameter space. In the case when M=2, the manifold is referred to as a parametric surface.

Another way of representing an M-dimensional manifold is in the implicit form as the M-dimensional level set of a function $f(x_1, \ldots, x_D)=0$. For example, a 2-dimensional manifold (surface) is represented by a function defined on the 3D Euclidean space. Often, $f$ is chosen as the distance from the manifold.

The previous models are ordered in terms of generality.

According to the present invention, the geometric domains defined in terms of one of the previous formulas are associated to a discrete approximation.

Figure 6:
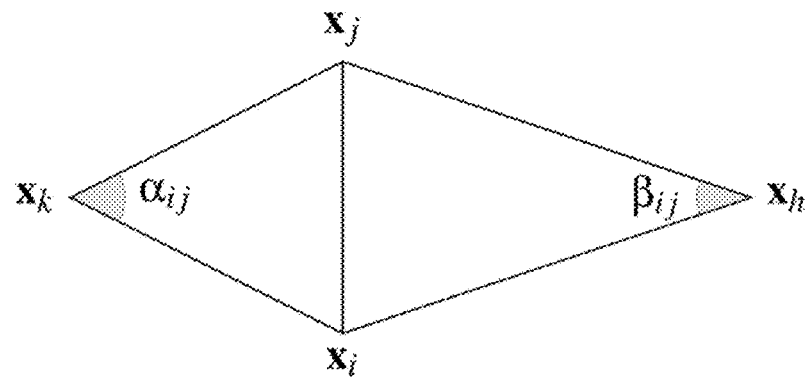
FIG. 6 schematically shows the terms involved in the definition of the LBO discretization.

For instance, the manifold X can be associated to a discrete approximation X by sampling N points $x_1, \ldots, x_N \in X$. The discrete approximation can be represented in different ways, including:

- a point cloud $V \in \mathbb{R}^{N \times 3}$, where for each point $x_i$, $i=1, \ldots, N$, is specified a coordinate in $\mathbb{R}^3$ stored in the ith row of the matrix V. These data are the typical output of 3D acquisition devices such as Microsoft Kinect or Intel RealSense;
- a mesh (V,E,F), for instance a manifold triangular mesh with vertices $V \in \mathbb{R}^{N \times 3}$, edges $E \in \{1, \ldots, N\} \times \{1, \ldots, N\}$, and faces $F \in \{1, \ldots, N\} \times \{1, \ldots, N\} \times \{1, \ldots, N\}$, where each interior edge $(i,j) \in E$ is shared by exactly two triangular faces $(i,j,k),(i,j,h) \in F$, as represented in FIG. 6. Boundary edges belong to exactly one triangular face.

Figure 5A:
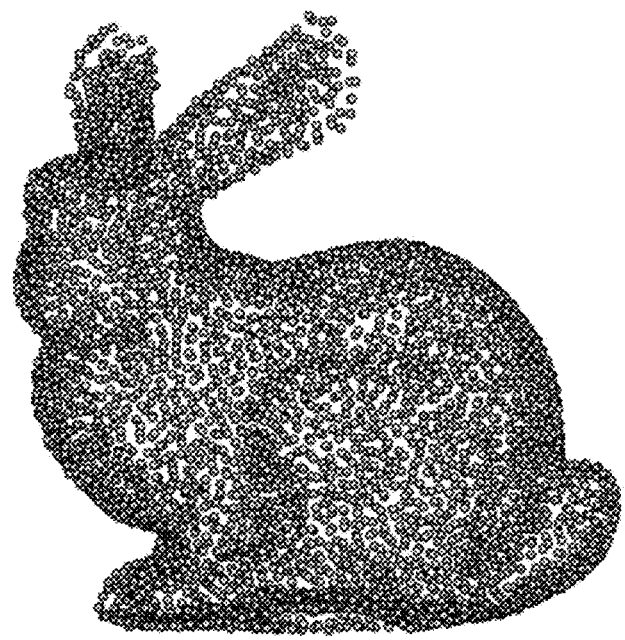
FIGS. 5A and 5B schematically represents a discrete representation of a geometric domain in the form of a triangular mesh and a discrete representation of a geometric domain in the form of a point cloud, respectively.
Figure 5B:
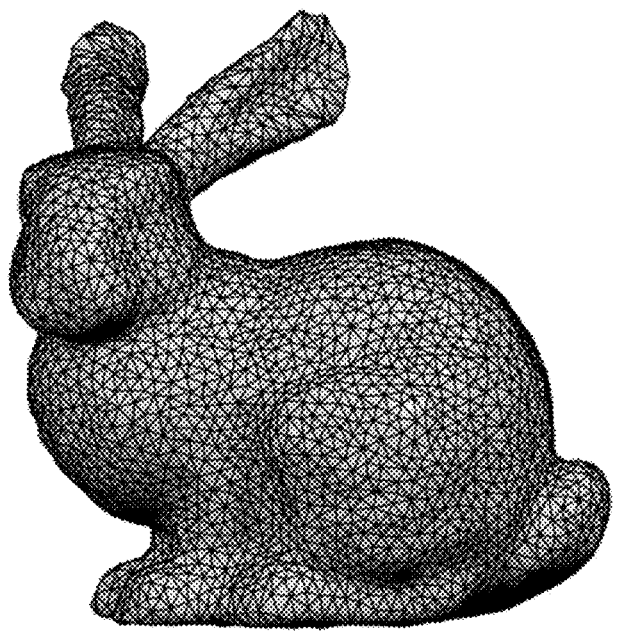

FIG. 5A schematically represents a discrete approximation of a geometric domain X in the form of a point cloud, and FIG. 5B a discrete approximation of the geometric domain X in the form of a mesh.

Graphs, instead, can be modeled as the pair (V,E), where $V=\{1, \ldots, N\}$ is a set of N vertices or nodes, and $E \in \{1, \ldots, N\} \times \{1, \ldots, N\}$ is the set of edges connecting the vertices. The main difference with the previous models resides in the fact that a graph is a purely topological notion, therefore the vertices are not associated with any coordinate in $\mathbb{R}^3$.

According to the present invention, given the geometric domain X, data on X are defined in terms of functions $f: X \to \mathbb{R}^Q$, where Q represents the dimensionality of the data. When the geometric domain X is approximated with one of the previous discrete approximation X, then data can be defined in terms of maps $f:V \to \mathbb{R}^Q$, where V are the vertices of the discretization X. If Q=1, than f is the N-dimensional vector $f=(f(x_1), \ldots, f(x_N))^T$, where $\bullet^T$ is the transposition operator.

The steps of the method of the present invention are executed on data defined on the discrete approximation X of the geometric domain X.

Examples of such functions for defining data are:

geometric information, such as the Gaussian curvature $K(x_i)=\kappa_m(x_i)\kappa_M(x_i)$, where $\kappa_m(x_i), \kappa_M(x_i)$ represent the minimum and maximum curvature of the point $x_i \in X$ respectively;

color information, such as color texture in the RGB color space $f:V \to \mathbb{R}_3$, $x_i \to (R_i,G_i,B_i)$ where $R_i,G_i,B_i$ are scalars associated to the red, green, and blue channels respectively;

semantic information, such as the meaning or the name of some shape parts. If, for instance, we consider the 3D shape of a human body, the function $f:\overline{V} \subseteq f:V \to \mathbb{N}$ can map a sparse set of vertices $\overline{V}$ to their anatomical name (knee, shoulder, ...), labeled as natural numbers. If we consider the graph of a social network, examples of data can be the genre of the people corresponding to the nodes ($f:V \to \{0,1\}$, where 0 is male and 1 female) or their favorite film ($f:V \to \mathbb{N}$, where the films are labeled with natural numbers) or more generally, any function $f:V \to \mathbb{R}$.

Data on the geometric domain X may be defined also through spectral properties of the Laplace-Beltrami operator $\Delta_X f = -\text{div}_X(\nabla_X f)$, a generalization of the classical Laplacian to non-Euclidean spaces.

The Laplace-Beltrami operator (LBO) is intrinsic, i.e. it does not depend on the embedding of the manifold. As a result, it is invariant to isometric (metric preserving) deformations of the manifold. If, for instance, the manifold X represent a human body, then the LBO and all the derived quantities are invariant to, e.g., pose changes (different positions of arms, legs, ...).

On a compact manifold, the LBO admits an eigendecomposition $\Delta_X \phi_k = \Lambda_k \phi_k$ with real eigenvalues $\{0 = \lambda_1 \geq \lambda_2 \leq \ldots\}$. The eigenvalues set $\{\lambda_k\}_{k \geq 1}$ is also known as the spectrum of the LBO. The corresponding eigenfunctions $\{\phi_k\}_{k \geq 1}$ form an orthonormal basis on $L^2(X)$, which is a generalization of the Fourier basis to non-Euclidean domains.

Any function $f \in L^2(X)$ can be represented as the Fourier series $f(x) = \Sigma_{k \geq 1} \langle f, \phi_k \rangle_{L^2(X)} \phi_k(x)$, where the analysis $\hat{f}_k = \langle f, \phi_k \rangle_{L^2(X)}$ can be regarded as the forward Fourier transform and the synthesis $\Sigma_{k \geq 1} \hat{f}_k \phi_k(x)$ is the inverse one. The eigenvalues $\{\lambda_k\}_{k \geq 1}$ plays the role of frequencies.

The generalized convolution of $f,g \in L^2(X)$ can be defined by analogy to the classical case as the inverse transform of the product of forward transforms, $(f*g)(x) = \Sigma_{k \geq 1} \hat{f}_k \hat{g}_k \phi_k(x)$ and is, in general, non shift-invariant.

The LBO can be used to describe physical processes on geometric domains. For instance, the heat diffusion on a geometric domain X can be described in the simplest setting through the isotropic heat equation:

$$\begin{cases} f_t(x,t) = -\Delta_X f(x,t) \\ f(x,0) = f_0(x) \end{cases}$$

where $f(x,t)$ denotes the amount of heat at point x and time t and $f_0(x)$ is the initial heat distribution. The solution of the previous equation is obtained as $f(x,t) = h_t(x,x')*f_0(x)$, where $h_t(x,x')$ is the heat kernel. In the spectral domain the heat kernel is expressed as $$h_t(x,x') = \Sigma_{k \geq 1} e^{-t\lambda_k} \phi_k(x) \phi_k(x').$$

The isotropic heat equation assumes that the heat conduction properties of the manifold are constant at every point. A more general diffusion equation has the form $f_t(x,t) = \text{div}_X(D(x)\nabla_X f(x,t))$, where D(x) is the thermal conductivity tensor (in the discrete settings, the operator D(x) can be represented as the 2×2 matrix D) applied to the gradient in the tangent plane. The thermal conductivity tensor allows modeling heat flow that is position- and direction-dependent; the diffusion equation in this case is called anisotropic.

The eigendecomposition and the heat kernel associated with the anisotropic LBO $\overline{\Delta}_X = -\text{div}_X(D(x)\nabla_X f(x,t))$ are defined in the same way as the ones for the LBO one. They will be referred to herein as anisotropic eigenfunctions and anisotropic heat kernel respectively.

On a discrete approximation X of the geometric domain, the LBO $\Delta_X$ can be defined as an N×N matrix $L = A^{-1}W$, where $$w_{ij} \begin{cases} \dfrac{\cot\alpha_{ij} + \cot\beta_{ij}}{2}, & ij = E \\ -\sum_{k \neq i} w_{ik}, & i = j \\ 0, & \text{else} \end{cases}$$

where $\alpha_{ij},\beta_{ij}$ denotes the angles $\angle ikj, \angle ihj$ of the triangles sharing the edge ij, and $A=\text{diag}(a_1, \ldots, a_N)$ with $a_i=\frac{1}{3}\Sigma_{jk:ijk\in F}A_{ijk}$ being the local area element at vertex i and $A_{ijk}$ denoting the area of the triangle ijk. FIG. 6 schematically shows the terms involved in the definition of the LBO discretization.

The first $K \leq N$ eigenvectors and eigenvalues of L are computed by performing the generalized eigendecomposition $W\Phi=A\Phi\Lambda$, where $\Phi=(\phi_1, \ldots, \phi_K)$ is an $N\times K$ matrix containing as columns the discretized eigenfunctions and $\Lambda=\text{diag}(\lambda_1, \ldots, \lambda_K)$ is the diagonal matrix of the corresponding eigenvalues.

Through the eigendecomposition of the LBO it is possible to define meaningful features $f:V\to \mathbb{R}^Q$ that can be considered input data for the method of the present invention. For instance, global point signature is defined as $f(x)=(\lambda_1^{-1/2}\phi_1(x), \ldots, \lambda_Q^{-1/2}\phi_Q(x))$.

Other spectral shape descriptors take a generic form of the diagonal of a parametric kernel diagonalized by the LBO eigenbasis. More specifically, at each point a descriptor may be constructed as $$f(x)=\Sigma_{k\geq 1}\tau(\lambda_k)\phi_k^2(x),$$

where $\tau(\lambda)=(\tau_1(\lambda), \ldots, \tau_Q(\lambda))$ represents a bank of transfer functions. By changing the transfer functions $\tau(\lambda)$ different shape properties are described or emphasized.

Relevant examples include:
heat kernel signature (HKS) considers low-pass transfer functions $\tau_t(\lambda)=e^{-t\lambda}$ for various values of the parameter $t\in\{t_1, \ldots, t_Q\}$. The resulting descriptor gives rise to the autodiffusivity function $h_t(x,x)$ (diagonal of the heat kernel), whose physical interpretation is the amount of heat remaining at x after time t;
wave kernel signature (WKS) considers bans-pass transfer functions $\sigma_v(\lambda)=e^{((\log v-\log \lambda)/2\sigma^2)}$ for various values of the parameter $v=\{v_1, \ldots, v_Q\}$. The physical interpretation of WKS is the probability to find a quantum particle at point x, given that it has an initial log-normal energy distribution with mean value v and variance $\sigma$;
geometry vector instead considers $\sigma_q(\lambda)=\beta_q(\lambda_k)$, $q=1, \ldots, Q$, where $\beta=\{\beta_1, \ldots, \beta_Q\}$ represents a B-spline basis on the spectrum of the LBO. Therefore each component $f_q$ of the descriptor, $q=1, \ldots, Q$, looks like $f_q(x)=\Sigma_{k\geq 1}\beta_q(\lambda_k)\phi_k^2(x)$.

According to the present invention, the convolution layer is applied to geometric domains by following the interpretation of convolution as "correlation with a template". This convolution layer is referred to as intrinsic convolution layer to avoid ambiguities with related art convolution layers, which are limited to be applied on Euclidean domains only and are not invariant to non-rigid deformations.

The intrinsic convolution layer comprises the steps of:
extracting a local representation of the input data $f$ around a point $x\in X$. Such local representation is hereafter referred as patch and the operator that extract the patches from the geometric domain X is referred as patch operator;
computing the correlation between the patches with a plurality of templates.

According to an aspect of the present invention, the patch operator may be defined in different ways. In particular, in the following description, three different patch operators are defined through which, respectively:
data can be represented in a local polar system of coordinates;
data can be transformed by a windowed Fourier transform;
data can be weighted by anisotropic heat kernels.

The patch operator takes in input data on the geometric domain and a point on said domain, and outputs the local representation of said input data around said point, wherein the local representation, depending on the operator used, is data represented in a local intrinsic polar system of coordinates, data transformed by a windowed Fourier transform, or data weighted by anisotropic diffusion kernels.

Advantageously, the patch operator to be used is selected depending on the kind of geometric domain on which data are defined. For instance, the construction of a patch as a local polar system of coordinates is limited to meshes only.

Moreover, depending on which patch operator is used, the step of correlating with a template is adapted. In the following, details of each of the three patch operators and how to correlate the extracted patches with a template are described.

Figure 7:
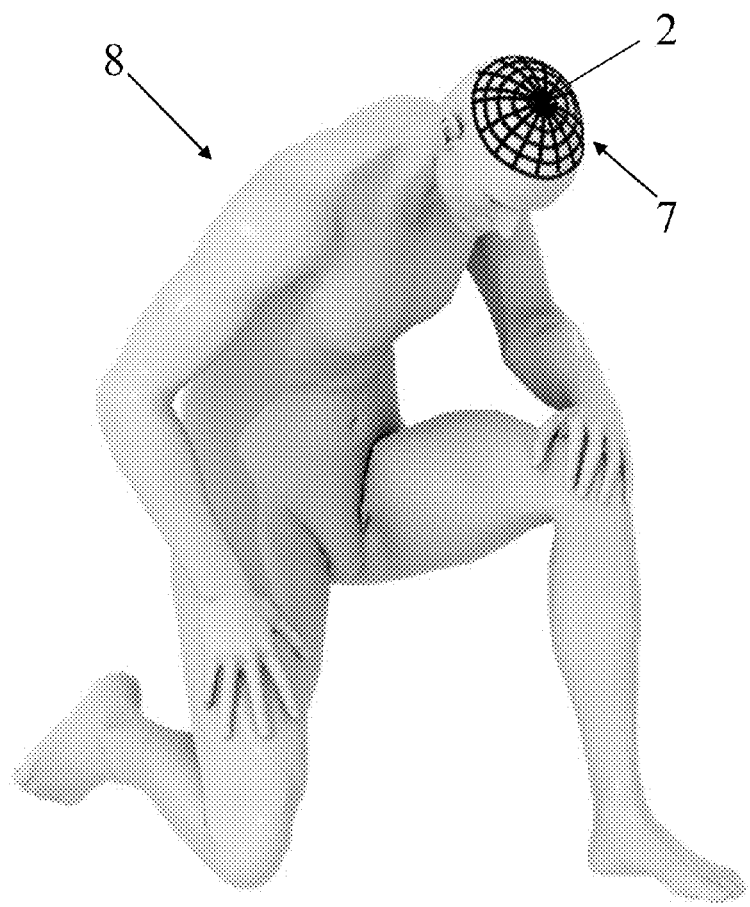
FIG. 7 schematically shows a patch in the form of a local polar system of coordinates on a 3D shape, according to a method of the present invention.

According to one aspect of the proposed invention, the patch operator computes a local representation of the data $f$ around each input vertex of the geometric domain by interpolating the data $f$ on a local polar system of coordinates previously extracted. In more detail, given a point $x\in X$, such patch operator is constructed following two steps:
construction of a local polar system of coordinates on the geometric domain X, i.e. a bijection $\Omega(x):B_{\rho_0}(x)\to[0,\rho_0]\times[0,2\pi)$ that maps a local neighborhood of x to a system of polar coordinates $(\rho,\theta)$. This step is agnostic on the data $f$. FIG. 7 schematically shows how such local polar system of coordinates 7 around a point 2 looks on a 3D shape representing a man 8.
construction of interpolation weights $\Pi(x) f$ for the data $f$ on such polar system of coordinates, i.e. $(\Pi(x)f)(\rho,\theta)=(f\circ\Omega^{-1}(x))(\rho,\theta)$. $\Pi$ will be referred to as the patch operator and $\Pi(x)f$ will be referred to as the patch on the geometric domain X centered at the point $x\in X$.

The construction of a local polar system of coordinates includes the following steps:
extraction of intrinsic distance from the point $x\in X$ to all the other points of the geometric domain X. Examples of intrinsic distances include:
geodesic distance, which measures the length of the shortest path along the geometric domain X between two points $x,x'\in X$. The main drawbacks of such distance are that it requires a mesh structure and it is sensitive to "topological noise" (e.g., holes in the geometric domains caused by an imprecise acquisition of the 3D geometry);
diffusion distance, which measures the distance between two points $x,x'\in X$ by the diffusion process $d_X^2(x,x')=\Sigma_{k\geq 1}e^{-t\lambda_k}(\phi_k(x)-\phi_k(x'))^2$, where $\phi_k,\lambda_k$ are the kth eigenfunction and eigenvalue of the LBO respectively;
commute time distance, which measures the distance between two points $x,x'\in X$ as the average of the time a random walker would take to travel from x to x' and back. The commute time distance can be represented in terms of eigenfunctions and eigenvalues of the LBO as $$d_X^2(x,x')=\sum_{k\geq 1}\frac{(\phi_k(x)-\phi_k(x'))^2}{\lambda_k};$$

biharmonic distance, measures the distance between two points x,x'∈X as $d_X(x,x')=g(x,x)+g(x',x')-2g(x,x')$, where $$g(x, x') = \sum_{k \geq 1} \frac{\phi_k(x)\phi_k(x')}{\lambda_k^2}$$

is the Green's function of the biharmonic operator $\Delta^2$. When represented in terms of eigenfunctions and eigenvalues of the LBO, the biharmonic distance formula differs from the commute time distance one only slightly:

$$d_X^2(x, x') = \sum_{k \geq 1} \frac{(\phi_k(x) - \phi_k(x'))^2}{\lambda_k^2};$$

computation of the radial coordinates as the ρ-level set $\{x':d_X(x,x')=\rho\}$ of one of the previous intrinsic distances (geodesic, diffusion, . . . ) for $\rho=[0,\rho_0]$. $\rho_0$ will be referred to as the radius of the local patch. Empirically $\rho_0$ can be chosen equal to some small percentage of the intrinsic distance diameter, e.g. $\rho_0 \approx 1\%$ of the geodesic diameter;

computation of the angular coordinates as a set of geodesics $\Gamma(x,\theta)$ emanating from x in direction θ such that they are perpendicular to the ρ-level set described in the previous step for $\theta=[0,2\pi)$;

The previous steps are repeated for all the points of the geometric domain X. In particular, FIG. 7 shows the resulting patch when the steps above are executed starting from the point 2 and the geometric domain is a man 8.

Given the angular and radial coordinates, the interpolation weights $\Pi(x)f$ can be defined as:

$$(\Pi(x)f)(\rho, \theta) = \int_X w_{\rho,\theta}(x, x')f(x')dx', \text{ where}$$

$$w_{\rho,\theta}(x, x') = \frac{w_\rho(x, x')w_\theta(x, x')}{\int_X w_\rho(x, x')w_\theta(x, x')dx'},$$

and $w_\rho(x,x')$, $w_\theta(x,x')$ are the radial and angular interpolation weights, respectively.

Figure 8A:
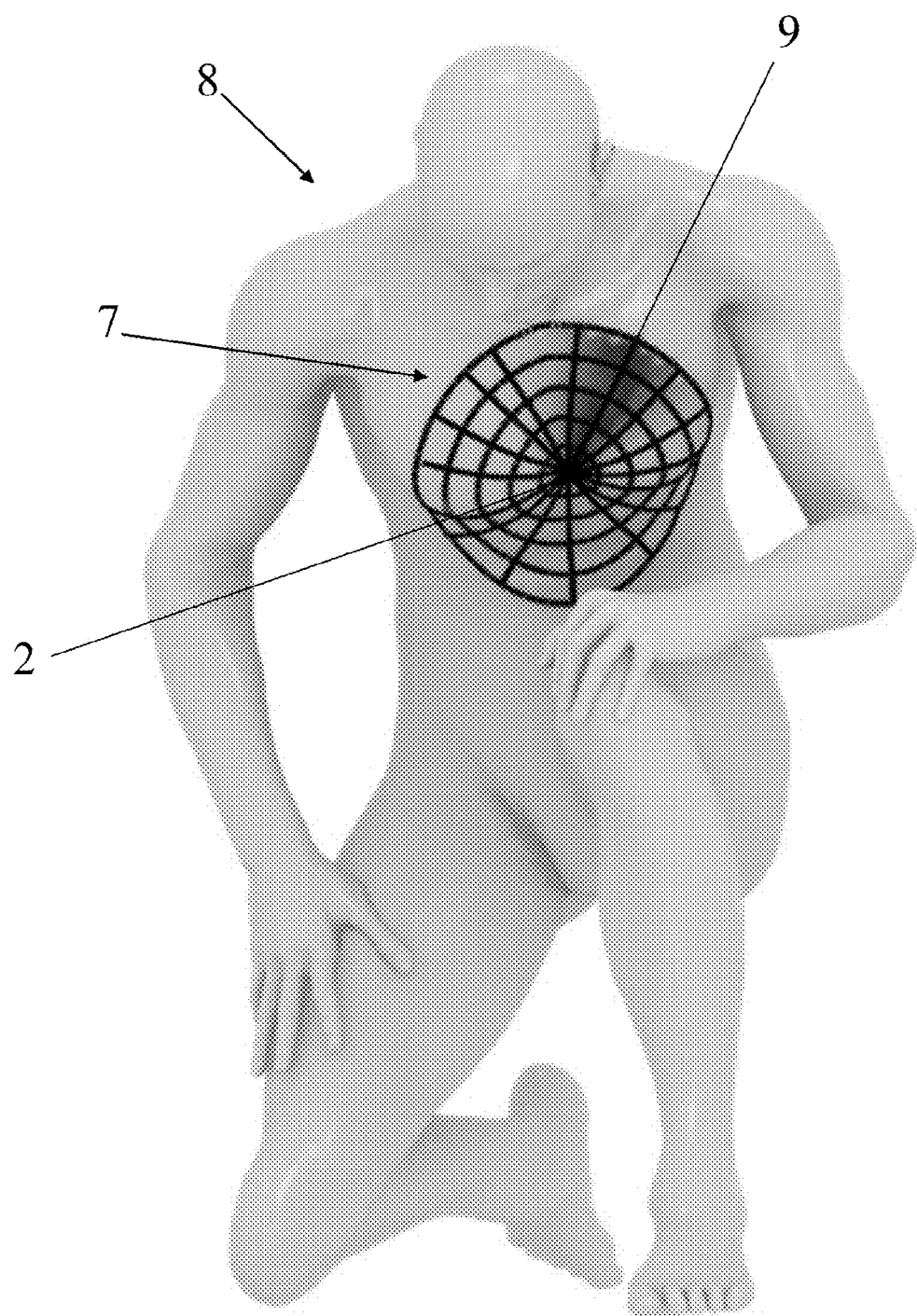
FIGS. 8A and 8B schematically represents the radial interpolation weights and the angular interpolation weights, according to a method of the present invention.

For instance, the radial interpolation weights can be defined as a Gaussian $w_\rho(x,x') \propto e^{-(d_X(x,x')-\rho)^2/\sigma_\rho^2}$ of the intrinsic distance from x, centered around the radius ρ. FIG. 8A schematically represents the radial interpolation weights for the point 2 along the radius 9, where the weights are represented in different grey scales.

Figure 8B:
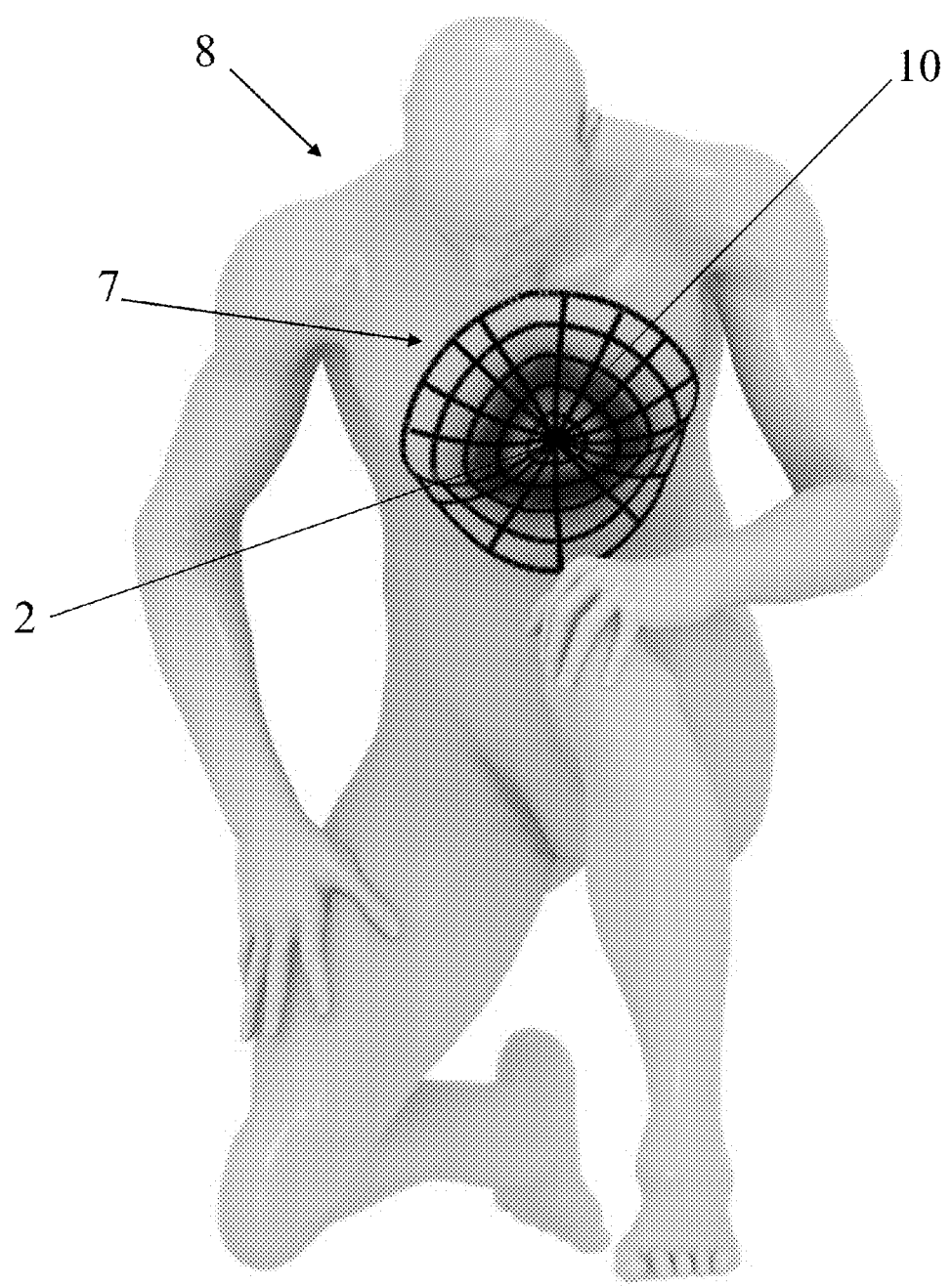

The angular interpolation weights can be defined as a Gaussian $w_\theta(x,x') \propto e^{-d_X^2(\Gamma(x,\theta),x')/\sigma_\theta^2}$ of the point-to-set distance $d_X^2(\Gamma(x,\theta),x')=\min_{x''\in\Gamma(x,\theta)}d_X(x'',x')$. FIG. 8B schematically represents the angular interpolation weights for the point x along the angle 10, where the weights are represented in different grey scales.

Figure 9A:
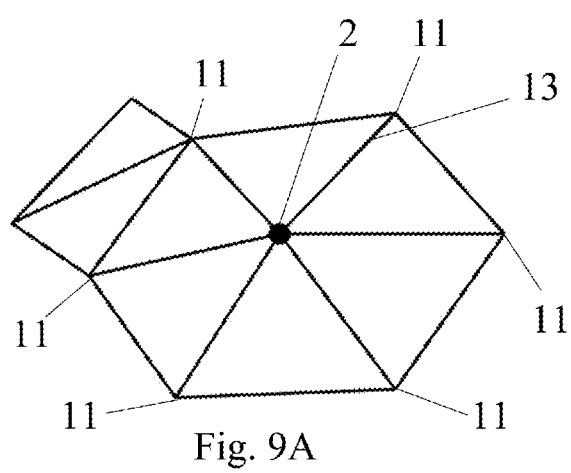
FIGS. 9A-9F schematically represent the patch discretization when the patch is in the form of the local polar system of coordinates, according to a method of the present invention.
Figure 9B:
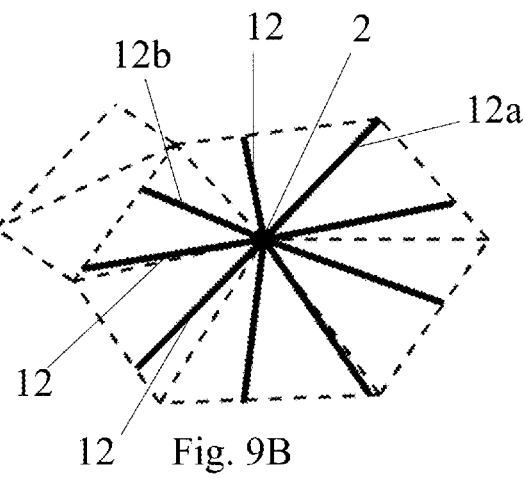
Figure 9C:
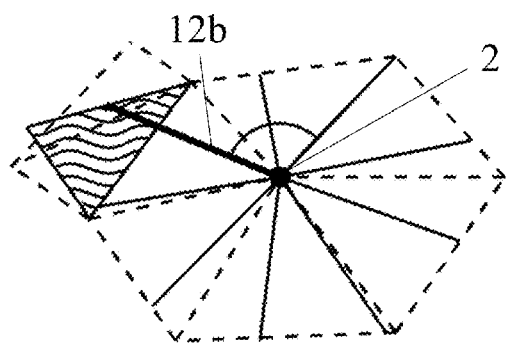
Figure 9D:
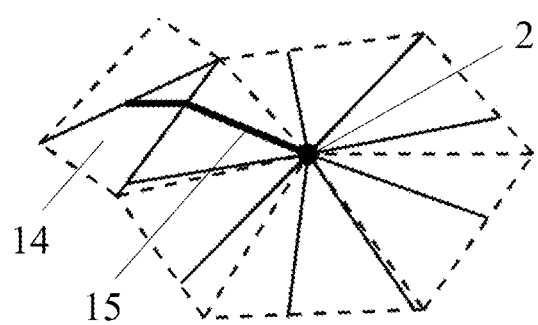
Figure 9E:
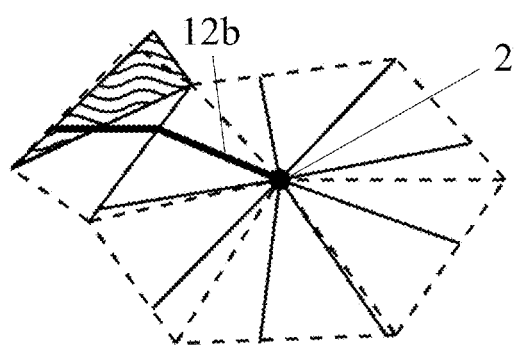
Figure 9F:
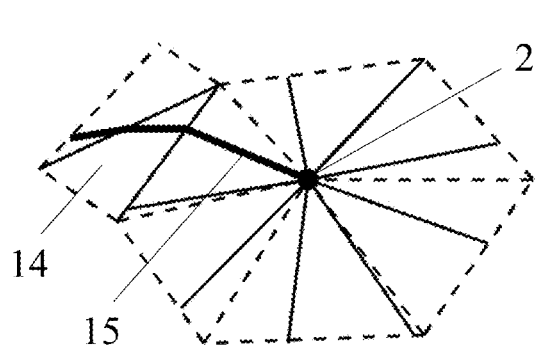

If the geometric domain is approximated with a (manifold triangular) mesh, the local system of coordinates previously described is sampled at $N_\theta$ angular and $N_\rho$ radial bins, obtaining in this way a discrete local system of coordinates. In more detail, with reference to FIGS. 9A-9F, the discretization procedure involves the following steps:

start with a vertex 2, partition the 1-ring 11 of the vertex 2 by $N_\theta$ rays 12 into equiangular bins, and align the first ray 12a with one of the edges 13, as illustrated in FIG. 9A;

propagate ray 12b into adjacent triangle 14 using an unfolding procedure (similar to the known one used in fast marching algorithm; as illustrated in FIGS. 9B-9F), thus producing the poly-lines 15 that form the angular bins;

create radial bins as level sets of the intrinsic distance function. If the chosen intrinsic distance is the geodesic one, then it can be discretized using the fast marching algorithm.

As a consequence, the patch operator Π can be represented in the discrete domain as a $N_\theta N_\rho N \times N$ matrix Π applied to the data f on the mesh and producing the patches at each vertex. Conveniently, the matrix Π is very sparse since the values of the function at a few nearby vertices only contribute to each local polar bin.

Once the patch operator $\Pi(x)f$ is computed, the convolution of $f \in L^2(X)$ with a template $a(\rho,\theta)$ is computed as $(f*a)(x)=\Sigma_{\theta,r}a(\theta+\Delta\theta,r)(\Pi(x)f)(r,\theta)$, where $a(\rho,\theta)$ is a template (or filter) applied on the patch (i.e. expressed in the same local representation than the data f). Due to angular coordinate ambiguity, the filter can be rotated by arbitrary angle Δθ.

Figure 10A:
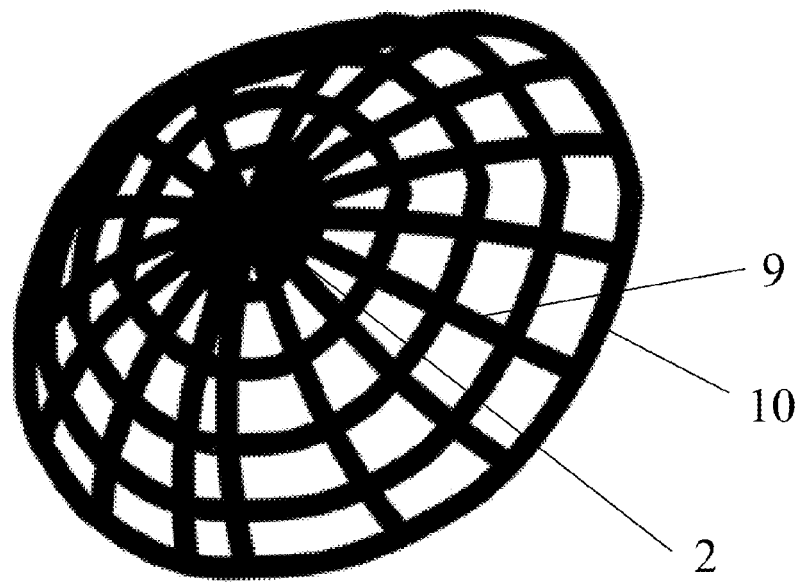
FIG. 10A schematically represents the patch of FIG. 7 separately from the 3D shape, and FIG. 10B schematically represents the patch of FIG. 10A after a conversion into a form adapted to be correlated with a template, according to a method of the present invention.
Figure 10B:
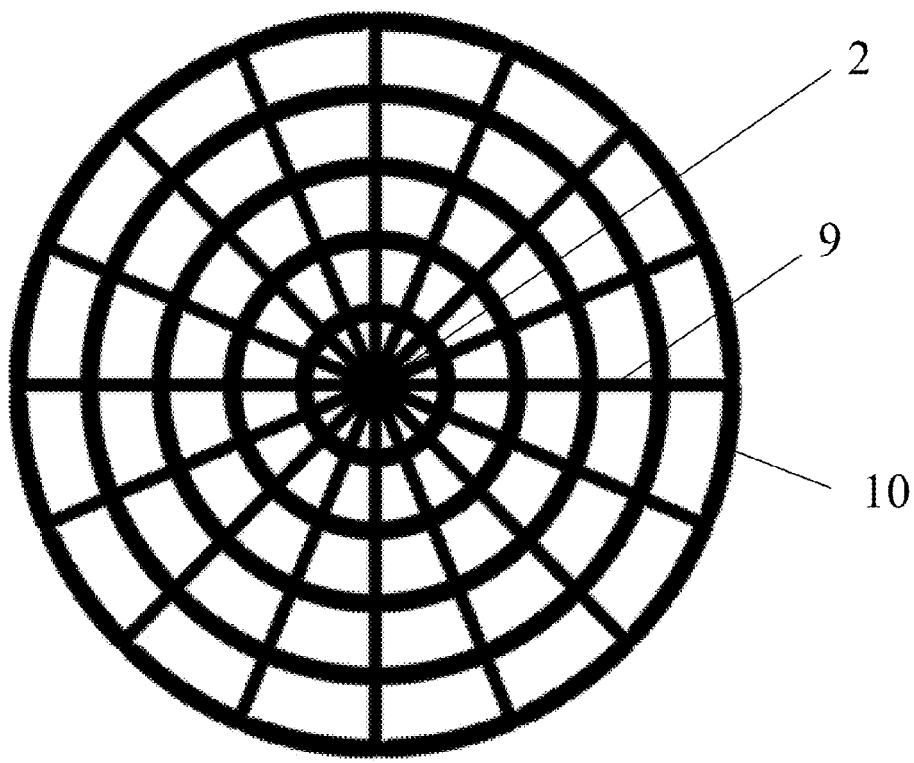
Figure 11:
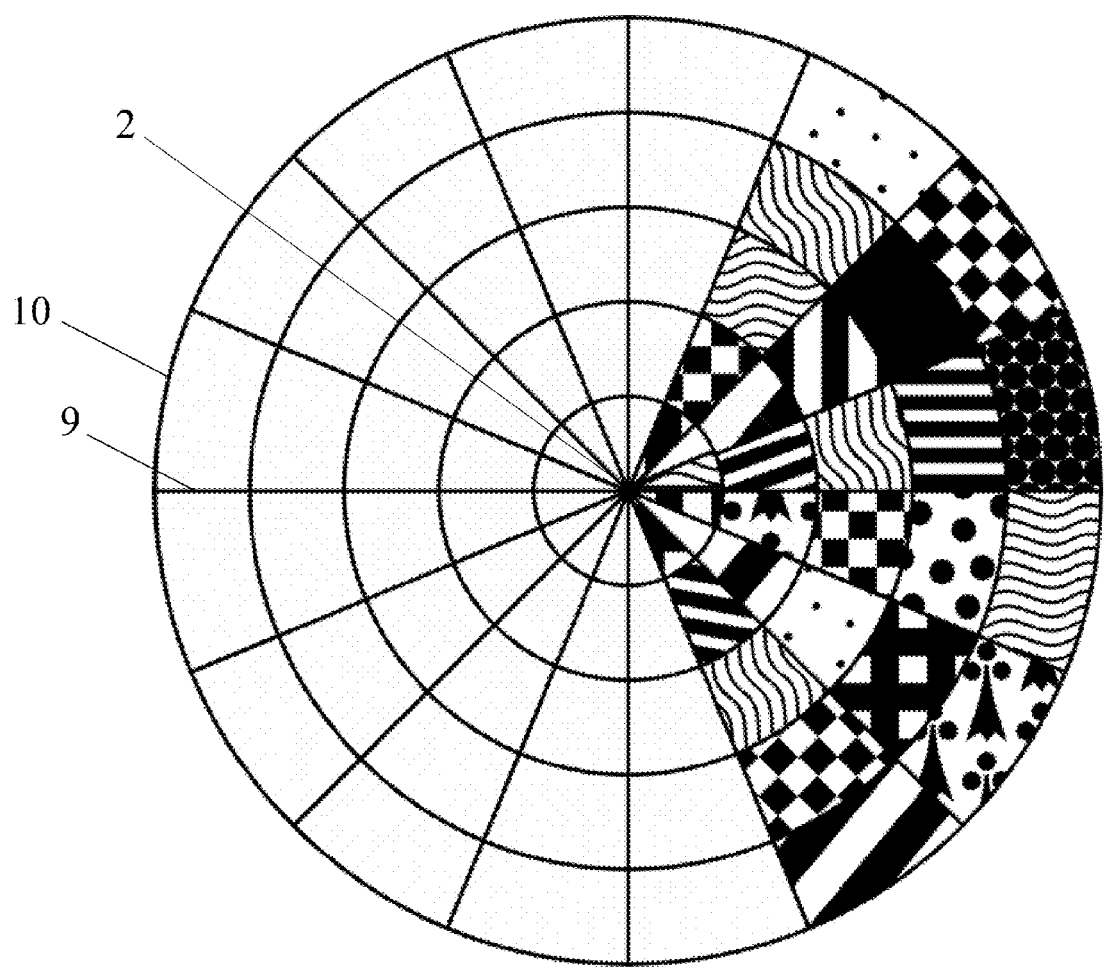
FIG. 11 schematically represents the patch of FIG. 10B wherein different values for each bin are represented with different patterns, according to a method of the present invention.

FIG. 10A shows the patch 7 of FIG. 7 in the form of a local polar system of coordinates defined on the geometric domain (without explicitly showing the man shape 8) and FIG. 10B shows the same patch 7 after being mapped to a traditional polar system of coordinates. The operation of correlating the patch with a template previously described is executed among traditional polar system of coordinates like the one represented in FIG. 10B. While in FIGS. 10A and 10B the interpolation weights are not shown for clarity of representation, in FIG. 11 such interpolation weights are shown as different patterns for each of the bins of the local polar system of coordinates as defined above. The patterns cover only a part of the patch for clarity reasons; in the actual method of the present invention the patterns cover all the bins of the patch.

In order to deal with the angular ambiguity, the method of the present invention may consider as side information to determine the origin of the angular coordinate of the local intrinsic polar system of coordinates, one of the following:

principal curvature direction at said point (only if geometric domain is a surface);

direction of minimal/maximal absolute change of the data at said point;

According to another aspect of the present invention, if no side information is available, it is known that the angular ambiguity can be removed by first applying the Fourier transform with respect to the angular coordinate and then taking the absolute value, i.e. $|\Sigma_\theta e^{-i\omega\theta}(\Pi(x)f(x))(\rho,\theta)|$. The Fourier transform translates rotational ambiguity into complex phase ambiguity, which is removed by the absolute value.

A further aspect of the method removes angular ambiguity by means of an angular max pooling procedure including the steps of:

creating $N_\theta-1$ additional copies of the template $a(\rho,\theta)$ by rotating it along the angular component θ by the angular bin magnitude, obtaining this way a total of $N_\theta$ templates;

computing the correlation $\Sigma_{\theta,r}a(\theta+\Delta\theta,r)(\Pi(x)f)(r,\theta)$ of the patch with all the $N_\theta$ rotated templates;

taking the maximum operation over all the rotations, which corresponds to selecting the template with the 'maximum response' to the given patch among the $N_\theta$ rotated templates.

On the basis of the idea that convolution in the spatial domain corresponds to a multiplication in the frequency domain, the method of the present invention defines the intrinsic convolution layer by applying a vertex-frequency analysis or a windowed Fourier transform (WFT) to the input data.

The computation of the patch operator using the WFT requires two steps:
the computation of the localized modulated atoms;
the computation of inner products with said atoms.

In the Euclidean domain, classical WFT analyzes the frequency content of a signal that is localized by means of a window. Given a function $f \in L^2(\mathbb{R})$, and a window $g$ localized at zero, the WFT is computed as $(Sf)_{x,\omega} = \int_\mathbb{R} f(x') g(x-x') e^{-ix'\omega} dx'$. WFT can also be represented as an inner product with a translated and modulated window, $(Sf)_{x,\omega} = \langle f, M_\omega T_x g \rangle_{L^2(\mathbb{R})}$, where $T_x$ represent the translation operator and $M_\omega$ the modulation operator, respectively.

The method of the present invention extends the notion of WFT to geometric domains by defining translation operator as $(T_x f)(x) = \sum_{k \geq 1} \hat{f}_k \phi_k(x') \phi_k(x)$ and by defining the modulation operators as $(M_k f)(x) = \phi_k(x) f(x)$, where $\hat{f}$ is the Fourier transform of the input data $f$ and $\{\phi_k\}_{k \geq 1}$ can be the isotropic LBO eigenfunctions or the anisotropic LBO eigenfunctions.

Figure 12:
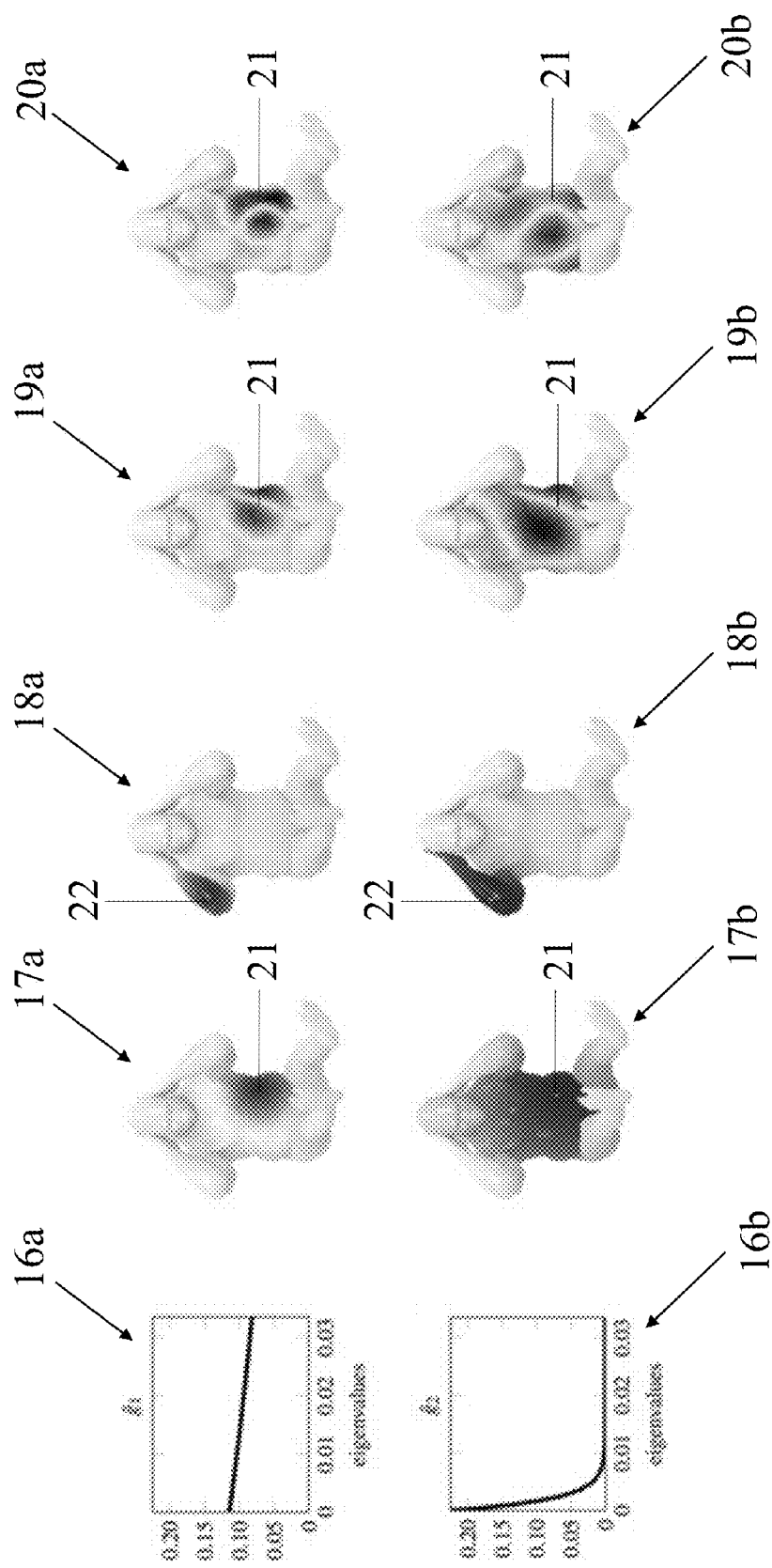
FIG. 12 schematically represents the translation and modulation operators for the definition of patch in the form of WFT analysis for two different windows, according to a method of the present invention.

FIG. 12 schematically represents the translation and modulation operators for the definition of patch in the form of WFT analysis for two different windows 16a, 16b. In particular, with reference numbers:

17a (respectively, 17b) are indicated translation operators centered around the point 21 and corresponding to the window 16a (respectively, 16b);

18a (respectively, 18b) are indicated translation operators centered around the point 22 and corresponding to the windows 16a (respectively, 16b);

19a, 20a (respectively, 19b, 20b) are indicated modulation operators for the point 21 and corresponding to the window 16a (respectively, 16b);

Combining the two operators together, a modulated and translated window $M_\omega T_x g$, called atom can be obtained. Accordingly, on geometric domains $(Sf)_{x,\omega} = \langle f, M_\omega T_x g \rangle_{L^2(X)} = \sum_{l \geq 1} \hat{g}_l \phi_l(x') \langle f, \phi_l \phi_k \rangle_{L^2(X)}$. The patch operator can then be defined as $\Pi(x) f = ((Sf)_{x,1}, \ldots, (Sf)_{x,K})$, where $k=1, \ldots, K$ are the first K frequencies of the WFT.

If a discrete approximation of the geometric domain is provided, the WFT can be computed as $Sf = (f \square \Phi)^T A\Phi(\hat{g} \square \Phi^T)$, where $\hat{g}$ is the K-dimensional vector representing the window in the frequency domain, f is the N-dimensional vector representing the input function, and $(a \square B)_{ij} = a_i B_{ij}$ denotes the known Hadamard product, i.e. element-wise multiplication of a vector and a matrix, replicating the vector along the second dimension of the matrix. The resulting WFT is a matrix of size K×N.

If the patch operator is provided by means of WFT, the correlation with a template a reduces to a simple multiplication, i.e. $(f*a)(x) = \sum_{p=1}^{P} \sum_{k=1}^{K} a_{qpk} |(Sf_p)_{x,k}|$, $q=1, \ldots, Q$, where $p=1, \ldots, P$ represent the dimension of the input function and the absolute value is considered to reduce the effect of the LBO eigenfunctions sign ambiguities.

Advantageously, according to the subject invention, the Fourier transform of the window $\hat{g}$ can not only be a fixed filter, but can also be parameterized in some fixed interpolation basis in the frequency domain (e.g. the B-spline basis $\beta = \{\beta_1, \ldots, \beta_Q\}$ on the LBO spectrum), $\widehat{g_p}(\lambda) = \sum_{m=1}^{M} b_{pm} \beta_m(\lambda)$, $p=1, \ldots, P$, where the P×M matrix $(b_{pm})$ of learnable weights defines the windows.

According to another embodiment of the present invention, the patch operator can be defined through anisotropic heat kernels. In this setting, the main idea is to build a local representation of the given data $f$ around the point x by averaging a variety of anisotropic heat kernels at different directions. Such kernels capture local directional structures similarly to the local polar system of coordinates previously described.

The construction of such local kernels requires two steps:
the computations of the thermal tensor $D_\alpha(x)$ which favors the heat diffusion towards a certain direction. The parameter $\alpha$ controls the degree of anisotropy;
the computation of the rotated heat kernels $D_{\alpha\theta}(x) = R_\theta D_\alpha (x) R_\theta^T$ for various angles $\theta$.

For instance, $D_\alpha(x)$ can be defined as $$D_\alpha(x) = \begin{pmatrix} \psi_\alpha(k_M(x)) & 0 \\ 0 & \psi_\alpha(k_m(x)) \end{pmatrix},$$

where $$\psi_\alpha(x) = \frac{1}{1+\alpha|x|},$$

and $k_m(x), k_M(x)$ are the minimum and maximum curvature, respectively. In this situation, $D_\alpha(x)$ drives the diffusion in the direction of the maximum curvature $k_M(x)$.

Figure 14:
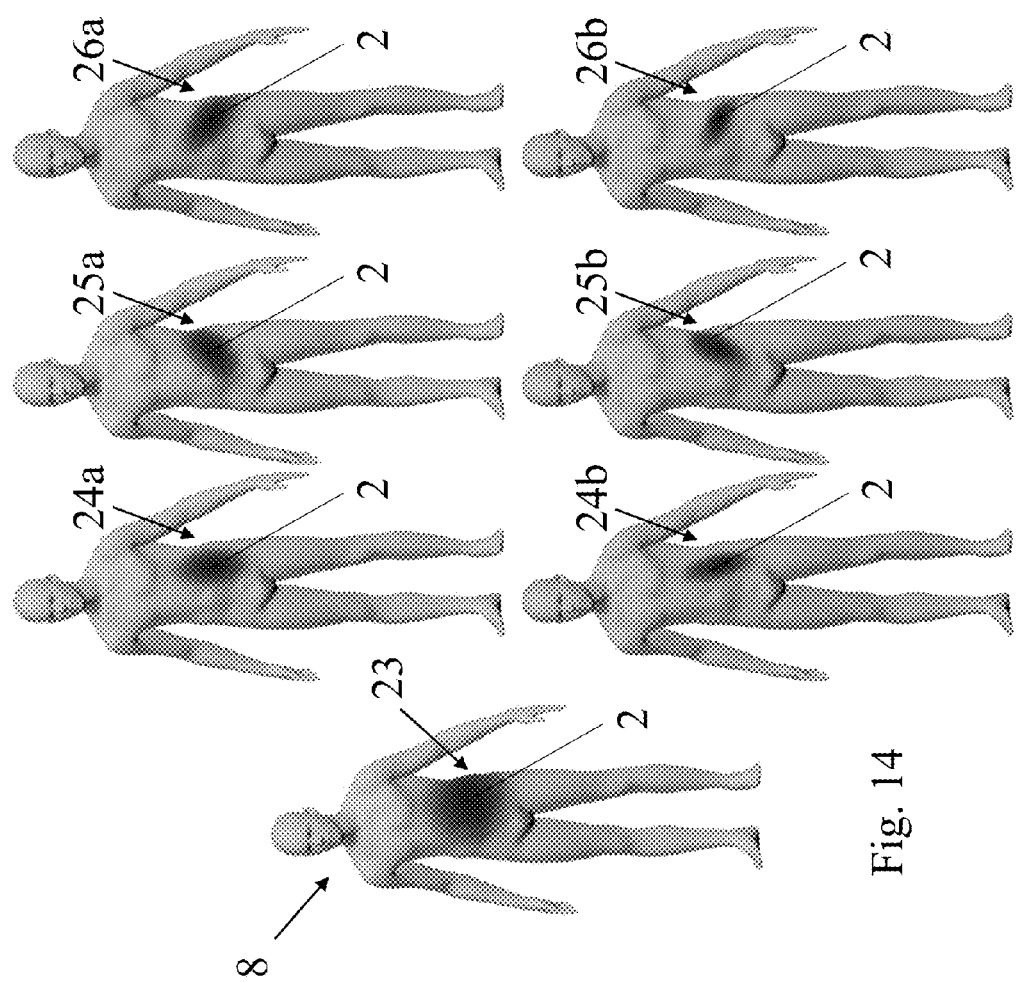
FIG. 14 schematically represents a comparison between isotropic heat kernels and a variety of anisotropic heat kernels for different anisotropy intensities and orientations, where the geometric domain is a mesh, according to a method of the present invention.

FIG. 14 schematically represents a comparison between an isotropic heat kernel 23 around the point 2 and a variety of anisotropic heat kernels 24a-26a, 24b-26b, wherein anisotropic heat kernels 24a, 25a, 26a are characterized by different orientation, while heat kernels 24a, 24b are characterized by different anisotropy intensity, and wherein the geometric domain is a mesh representing a man 8.

Figure 15:
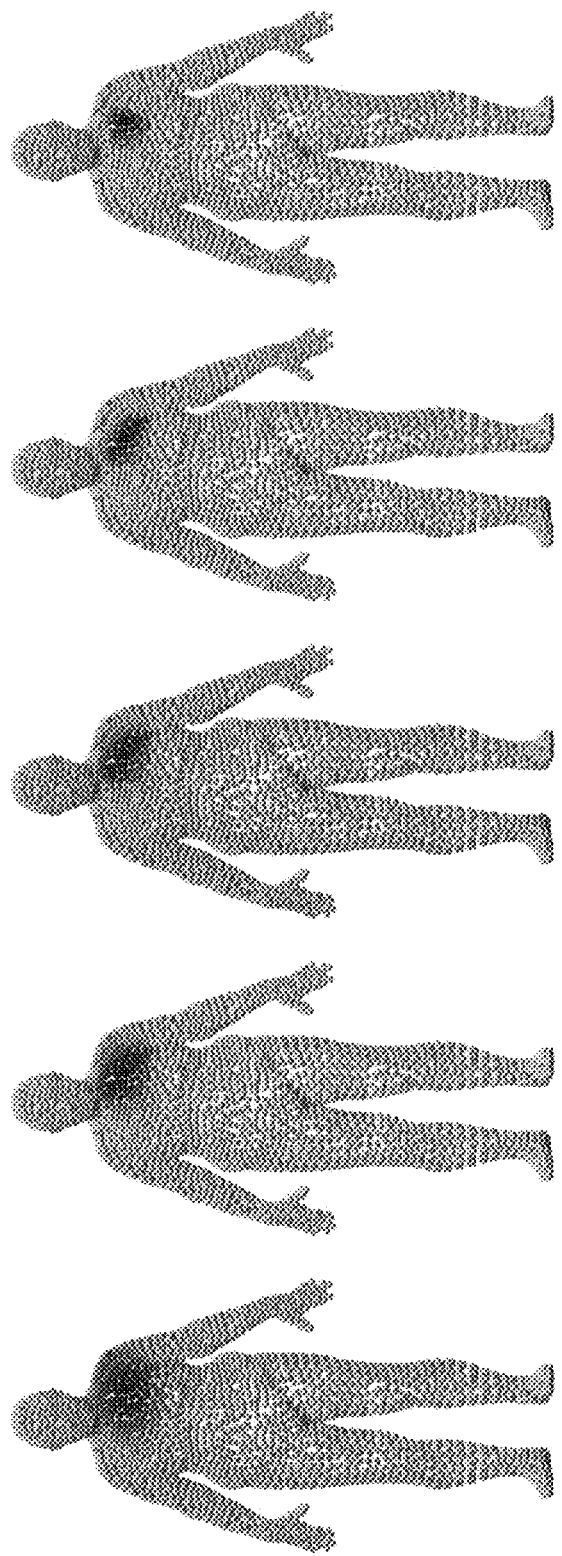
FIG. 15 schematically represents a comparison between isotropic heat kernels and a variety of anisotropic heat kernels for different anisotropy intensities and orientations, where the geometric domain is a point cloud, according to a method of the present invention.

FIG. 15 schematically represents the same comparison of FIG. 14, where the geometric domain is a point cloud.

This approach offers various advantages over the local polar coordinate system, including:
no angular ambiguity;
no restriction on the diameter of the local representation to guarantee valid topological disks;
no limit to meshes only.

Figure 13:
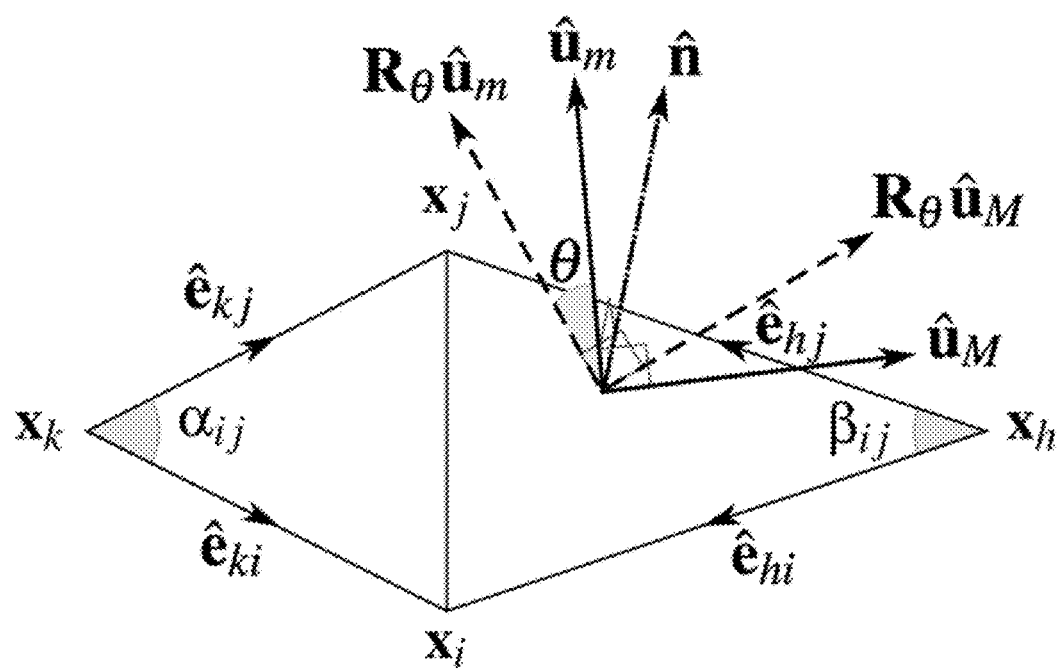
FIG. 13 schematically shows the terms involved in the definition of the anisotropic LBO discretization.

If the geometric domain is approximated with a triangular mesh X, the anisotropic LBO is defined as $\overline{L} = A^{-1} W$, where A is the same as the isotropic case and $$w_{ij} \begin{cases} \frac{1}{2}\left( \frac{\langle \hat{e}_{kj}, \hat{e}_{ki} \rangle_H}{\sin \alpha_{ij}} + \frac{\langle \hat{e}_{hj}, \hat{e}_{hi} \rangle_H}{\sin \beta_{ij}} \right), & ij = E \\ -\sum_{k \neq i} w_{ik}, & i = j \\ 0, & \text{else} \end{cases}$$

where $\langle \hat{e}_{kj}, \hat{e}_{ki} \rangle_H = \hat{e}_{kj}^T H \hat{e}_{kj}$, $$H = U_{ijk} \begin{pmatrix} D_\alpha & 0 \\ 0 & 1 \end{pmatrix} U_{ijk}^T$$

and $U_{ijk}=(\hat{u}_M,\hat{u}_m,\hat{n})$ is an orthonormal reference frame attached to each triangle $ijk \in F$. The shear matrix H encodes the anisotropic scaling operated by $D_\alpha$ up to an orthogonal basis change. If $D_\alpha=I, \langle \hat{e}_{kj}, \hat{e}_{ki} \rangle_H = \cos \alpha_{ij}$ and the isotropic LBO discretization is obtained. FIG. 13 schematically shows a representation of the terms involved in the definition of the anisotropic LBO discretization given above.

In order to allow arbitrary direction, the basis vectors $U_{ijk}$ is rotated on each triangle around the respective normal $\hat{n}$ by the angle $\theta$, equal for all triangles. Denoting as $R_\theta$ the corresponding 3×3 rotation matrix, this is equivalent to modifying the H-weighted inner product with the directed shear matrix $H_\theta = R_\theta H R_\theta^T$. The resulting weights $w_{ij}$ are thus obtained by using the inner products $\langle \hat{e}_{kj}, \hat{e}_{ki} \rangle_H = \hat{e}_{kj}^T H_\theta \hat{e}_{kj}$.

If the geometric domain is approximated with a point cloud instead, the procedure follows the following steps:
- for each point x in the point cloud, a local tangent plane is estimated by considering the points within an $\in$-ball $B_\in(x)$ using known techniques;
- the points in $B_\in(x)$ are projected onto the tangent plane;
- a Delaunay triangulation of the points projected on the tangent plane is constructed.

Once this local mesh triangulation is provided, the previous formulas still hold.

Following the same construction of known convolutional neural networks, the proposed method combines other known layers with the intrinsic convolution layer either to achieve better performance or to adapt the presented method to the desired application.

In particular, the proposed method includes several layers that can be applied subsequently, such that the output of the previous layer is used as input into the subsequent one to form a hierarchy of transformations. Other known layers include:
- linear layer or fully connected layer, given a P-dimensional input $f^{in}=(f_1^{in}(x), \ldots, f_P^{in}(x))$ produces a Q-dimensional output $f^{out}=(f_1^{out}(x), \ldots, f_Q^{out}(x))$ as linear combination of the input channels with a set of learnable parameters w, $f_q^{out}(x)=\Sigma_{p=1}^P w_{qp} f_p^{in}$, $q=1, \ldots, Q$;
- non-linear layer, optionally it follows a linear layer by applying a non-linear function $\xi$ to the output of the linear layer, i.e. $f_q^{out}(x)=\xi(f_p^{in})$, $q=1, \ldots, Q$. The non-linear functions $\xi$ are often referred to as activation functions. Most common activation functions include, but are not limited to:
ReLU, $\xi(f_p^{in})=\max\{0, f_p^{in}\}$;
logististic, $$\xi(f_p^{in}) = \frac{1}{1+e^{-f_p^{in}}};$$

hyperpolic tangent, $\xi(f_p^{in})=\tanh(f_p^{in})$;
softmax, $$\xi(f_p^{in}) = \frac{e^{f_p^{in}}}{\sum_{p=1}^P e^{f_p^{in}}};$$

spatial pooling layer, includes a spatial aggregation of input data to enforce a hierarchy structure in the learned features. More specifically, the spatial pooling layer comprises the steps of:

determining a subset of points $x_1, \ldots, x_N$ on the geometric domain X;
for each point $x_i$ of the subset, determining the neighbors $x_i^1, \ldots, x_i^M$ on the geometric domain;
computing an averaging operation on input data over the neighbors for all the points on said subset.

Averaging operations include the known arithmetic mean, $$f(x_i) = \frac{1}{M} \sum_{j=1}^M f(x_i^j);$$

a maximum operation, $f(x_i)=\max_{j=1, \ldots, M} f(x_i^j)$;
and the novel
weighted average with weights depending on an intrinsic distance between points, $f(x_i)=\Sigma_{j=1}^M d_X(x_i, x_i^j) f(x_i^j)$, where $d_X(\bullet;\bullet)$ is one of the intrinsic distances previously mentioned;
weighted average with weights depending on local volume elements $f(x_i)=\Sigma_{j=1}^M vol_X(x_i^j) f(x_i^j)$, where $vol_X(x_i^j)$ can be the area of a local patch around the point $x_i^j$;
covariance layer, it is used in applications such as retrieval where one needs to aggregate the point-wise descriptors to produce a global shape descriptor $f^{out}(x)=\int_X (f^{in}(x)-\mu)(f^{in}(x)-\mu)^T dx$, where $f^{in}(x)=(f_1^{in}(x), \ldots, f_P^{in}(x))$ is a P-dimensional input vector, $\mu=\int_X f^{in}(x)dx$, and $f^{out}(x)$ is a P×P matrix column-stacked into a $P^2$-dimensional vector. Typically, it is considered just before the output layer.

Each of the previous layers has input data and output data, and the output data of one layer in the sequence can be given as input to any subsequent layer, or layers, in the sequence. The present invention does not impose any constraint on the composition of said layers, including any limit on the order or the number of layers to consider.

Such sequence of customized layers can be thought of as a non-linear hierarchical parametric function $\psi_\Theta(F)$, where $F=(f(x_1), \ldots, f(x_N))$ is a P×N matrix of input features at all the points of the geometric domain, and $\Theta$ denotes the parameters of all the layers, and $\psi_\Theta(F)=\psi_N \circ \psi_{N-1} \circ \ldots \circ \psi_0(F)$, where $\psi_i$ indicates one of the aforementioned layers.

Advantageously, depending on the application in mind, the present invention allows to learn these parameters by minimizing some task specific cost function. The present invention allows learning of the parameters $\Theta$, i.e. intrinsic convolution templates, b-spline interpolation weights, linear combination weights, etc.

The applications that the proposed invention can deal with, include but are not necessarily limited to:
- invariant descriptors, i.e. finding descriptors that are the most similar as possible for corresponding points, or positives, and the most dissimilar as possible at non-corresponding points, or negatives;
- correspondences, i.e. labeling each vertex of a query geometric domain X with the index of a corresponding point on some reference geometric domain Y.
- shape retrieval, i.e. producing a global shape descriptor that discriminates between shape classes.

For this purpose, the present invention considers a siamese network configuration, composed of two identical copies of the same intrinsic convolutional neural network model sharing the same parameterization and fed by pairs of knowingly similar or dissimilar samples, and minimize a cost function such as, $l(\Theta)=(1-\gamma)\Sigma_{i=1}^{|T_+|} \|\psi_\Theta(f_i)-\psi_\Theta(f_i^+)\|^2 +$ $\gamma \Sigma_{i=1}^{|T_-|}(\mu-\|\psi_\Theta(f_i)-\psi_\Theta(f_i^-)\|)_+^2$, where $\gamma\in[0,1]$ is a parameter trading off between the positive and the negative losses, $\mu$ is a margin, $(x)_+ = \max\{0,x\}$ and $T_\pm = \{(f_i, f_i^+)\}$ denotes the sets of positive and negative pairs, respectively. Variants of such cost function can be used as well.

Other examples of cost functions do not rely on the siamese network construction, therefore they can be minimized by only one intrinsic convolutional neural network. Example of such cost functions are:

multinomial regression loss, $l(\Theta)=-\Sigma_{i=1}^{|T|} e_{ji} \log \psi_\Theta(f_i)$, where $e_i$ is a unit vector with one at index i, and $T=\{f(x_i),j_i\}$ represents a set of known correspondences.

regression loss, $l(\Theta)=\Sigma_{i=1}^{|T|} \|\psi_\Theta(f_i)-j_i\|_p$, where $j_i$ represents the desired output of the model (teacher signal) and $\|\bullet\|_p$ denotes the p-norm (usually p=2). As means of example $j_i$ can be the spectral coefficients of some target functions.

In some embodiments, the methods and processes described herein can be embodied as code and/or data. The software code and data described herein can be stored on one or more machine-readable media (e.g., computer-readable media), which may include any device or medium that can store code and/or data for use by a computer system. When a computer system reads and executes the code and/or data stored on a computer-readable medium, the computer system performs the methods and processes embodied as data structures and code stored within the computer-readable storage medium.

It should be appreciated by those skilled in the art that machine-readable media (e.g., computer-readable media) include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium that can be used with embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

In some embodiments, one or more (or all) of the steps performed in any of the methods of the subject invention can be performed by one or more processors (e.g., one or more computer processors). For example, any or all of the means for applying an intrinsic convolution layer, the means for applying one or more layers as described herein, the means for determining similarity between two geometric objects, and the means for determining correspondence between objects from a class of geometric objects and a reference object can include or be a processor (e.g., a computer processor) or other computing device.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A method for extracting hierarchical features from input data defined on a geometric domain, comprising applying on said input data at least an intrinsic convolution layer, including the steps of applying a patch operator to extract a local representation of input data around a point on the geometric domain and outputting the correlation of a patch resulting from the extraction with a plurality of templates, the method further comprising applying at least one of the following layers:
  a linear layer or fully connected layer, including outputting a weighted linear combination of input data;
  a non-linear layer, including applying a non-linear function to input data;
  a spatial pooling layer, including:
    determining a subset of points on the geometric domain;
    for each point of said subset, determining the neighbours on the geometric domain; and
    computing an averaging operation on input data over neighbours for all the points of said subset; and
  a covariance layer, including computing a covariance matrix of input data over all the points of the geometric domain;
wherein each layer has input data and output data and output data of one layer are given as input data to another layer.

2. The method according to claim 1, wherein two or more of said layers are applied in sequence, and the output data of one layer in the sequence is given as input data to a subsequent layer in the sequence.

3. The method according to claim 1, wherein the geometric domain is one of the following:
  a manifold;
  a parametric surface;
  an implicit surface;
  a mesh;
  a point cloud; or
  a graph.

4. The method according to claim 1, wherein parameters of the applied layer are determined by minimizing a cost function by means of an optimization procedure.

5. The method according to claim 4, wherein a plurality of said cost functions are defined, and wherein each of said cost functions is associated to one or more application for which feature extraction is carried out.

6. The method according to claim 4, wherein the input into the optimization procedure is a training set comprising:
  a positive set of pairs of points on one or more geometric domains; and
  negative set of pairs points on one or more geometric domains,
  wherein two identical copies of the hierarchical system configured with the same parameters are fed with pairs of points from said positive and negative sets, and
  wherein the optimization procedure tries to minimize the distance between the outputs corresponding to positive pairs and maximize the distance between the outputs corresponding to negative pairs.

7. The method according to claim 1, wherein the patch operator inputs input data on the geometric domain and said point on said domain, and outputs the local representation of said input data around said point, wherein the local representation is one or more of the following:
   input data represented in a local intrinsic polar system of coordinates;
   input data transformed by a windowed Fourier transform; and
   input data weighted by anisotropic diffusion kernels.

8. The method according to claim 7, wherein the patch operator outputs said local representation of input data in the local intrinsic polar system of coordinates, and wherein an origin of angular coordinates of the local intrinsic polar system of coordinates is provided as side information extracted from the geometric domain or the input data.

9. The method according to claim 8, wherein the geometric domain is a surface and the side information used to determine the origin of the angular coordinate of the local intrinsic polar system of coordinates at each point on the surface is a principle curvature direction at said point.

10. The method according to claim 8, wherein the side information used to determine the origin of the angular coordinate of the local intrinsic polar system of coordinates at each point is a direction of a minimal or maximal absolute change of the input data at said point.

11. The method according to claim 7, wherein the patch operator outputs said local representation of input data in the local intrinsic polar system of coordinates, and the Fourier transform is applied with respect to angular coordinates, followed by an absolute value operation.

12. The method according to claim 7, wherein the representation of input data in the local polar system of coordinates around the point on the geometric domain further comprises the steps of:
   computing an intrinsic distance from said point to all the other points on the geometric domain;
   computing level sets of said intrinsic distance at a plurality of levels;
   splitting a full angle at said point into a plurality of angular directions; and
   shooting rays emanating from said point along said directions perpendicular to said level sets.

13. The method according to claim 12, wherein said intrinsic distance is one of the following or an approximation thereof:
   geodesic distance;
   diffusion distance;
   commute time distance; or
   biharmonic distance.

14. The method according to claim 12, wherein the representation of input data further comprises the steps of
   computing weights localized around level sets and rays; and
   computing weighted averages of input data with each of said weights.

15. The method according to claim 7, wherein computing the windowed Fourier transform of input data further comprises:
   computing localized modulated atoms; and
   computing inner products of input data with said atoms.

16. The method according to claim 15, wherein localized modulated atoms are heat kernels multiplied by Laplacian eigenfunctions.

17. The method according to claim 16, wherein the heat kernels are anisotropic.

18. The method according to claim 7, wherein the computation of local representation of input data around a point on the geometric domain further comprises the steps of
   computing a plurality of directed anisotropic heat kernels at said point, corresponding to a plurality of anisotropy constants and directions; and
   computing weighted averages of input data with said directed anisotropic heat kernels.

19. The method according to claim 1, wherein the intrinsic convolution layer includes applying said patch operator to extract a local representation of input data in a local intrinsic polar system of coordinates around a point on the geometric domain, and outputting the correlation of a patch resulting from the extraction with a plurality of templates, the computation of said correlation further comprising the steps of:
   rotating each template along angular coordinates;
   computing the correlation of the patch with the rotated template; and
   taking a maximum operation over all the rotations.

20. The method according to claim 1, wherein the averaging operation includes one or more of the following:
   an arithmetic average;
   a maximum operation;
   an average weighted by weights dependent on a distance between points; and
   an average weighted by weights dependent on local volume elements.

21. A system for extracting hierarchical features from input data defined on a geometric domain, the system comprising: a processor: and a computer-readable medium having instructions stored thereon that, when executed by the processor, perform a method including applying on said input data at least an intrinsic convolution layer, wherein the program instructions are configured to apply a patch operator, to extract a local representation of input data around a point on the geometric domain, and to output the correlation of a patch resulting from the extraction with a plurality of templates,
   the program instructions being further configured for applying one or more of the following layers on said input data:
      an intrinsic convolution layer, to apply a patch operator for extracting a local representation of the input data around a point on the geometric domain and to correlate a patch. resulting from the extraction, with a plurality of templates;
      a linear layer or fully connected layer, to take said input data in input and to give in output a weighted linear combination;
      a non-linear layer, to take said input data in input into a non-linear function;
      a spatial pooling layer, to determine neighbours of a point on the geometric domain and to compute an averaging operation over the neighbours: and
      a covariance layer, to compute a covariance matrix of said input data in input over all the points of the geometric domain.

22. The system according to claim 21, wherein the geometric domain is one of the following:
   a manifold;
   a parametric surface;
   a mesh;
   a point cloud; or
   a graph.

23. The system according to claim 21, including an optimization procedure for minimizing a cost function to determine parameters of the layer to be applied.

24. The system according to claim 23, which stores a plurality of said cost functions, wherein each of said cost functions is associated to one or more application for which features may be extracted.

25. The system according to claim 24, including a training set as an input for the optimization procedure, comprising:
  a positive set of pairs of points on one or more geometric domains; and
  negative set of pairs points on one or more geometric domains,
  wherein two identical copies of the hierarchical system configured with the same parameters are fed with pairs of points from said positive and negative sets, and
  wherein the optimization procedure tries to minimize the distance between the outputs corresponding to positive pairs and maximize the distance between the outputs corresponding to negative pairs.

26. The system according to claim 21, wherein the patch operator is one or more of the following:
  a local polar system of coordinates;
  a windowed Fourier transform; and
  an anisotropic diffusion kernels.

27. The system according to claim 26, wherein the patch operator is configured to output said local representation of input data in the local intrinsic polar system of coordinates, and to provide an origin of angular coordinates of the local intrinsic polar system of coordinates as side information extracted from the geometric domain or the input data.

28. The system according to claim 27, configured to take a surface as a geometric domain and to a take a principle curvature direction at said point as the side information used to determine the origin of the angular coordinate of the local intrinsic polar system of coordinates at each point on the surface.

29. The system according to claim 27, configured to take a direction of a minimal or maximal absolute change of the input data at said point as the side information used to determine the origin of the angular coordinate of the local intrinsic polar system of coordinates at each point.

30. The system according to claim 26, wherein the patch operator is configured to output said local representation of input data in the local intrinsic polar system of coordinates, and to apply the Fourier transform with respect to angular coordinates, followed by an absolute value operation.

31. The system according to claim 26, wherein said program instructions are further configured to compute the windowed Fourier transform of input data by:
  computing localized modulated atoms; and
  computing inner products of input data with said atoms.

32. The system according to claim 31, wherein said localized modulated atoms are heat kernels multiplied by Laplacian eigenfunctions.

33. The system according to claim 32, wherein the heat kernels are anisotropic.

34. The system according to claim 26, wherein said program instructions are further configured for the computation of local representation of input data around a point on geometric domain by:
  computing a plurality of directed anisotropic heat kernels at said point, corresponding to a plurality of anisotropy constants and directions; and
  computing weighted averages of input data with said directed anisotropic heat kernels.

35. The system according to claim 21, wherein said program instructions are configured to apply said patch operator to extract a local representation of input data in a local intrinsic polar system of coordinates around a point on the geometric domain, and to output the correlation of a patch resulting from the extraction with a plurality of templates, and is further configured to:
  rotate each template along angular coordinates;
  compute the correlation of the patch with the rotated template; and
  take a maximum operation over all the rotations.

36. The system according to claim 21, wherein said program instructions are further configured to:
  compute an intrinsic distance from said point to all the other points on the geometric domain;
  compute level sets of said intrinsic distance at a plurality of levels;
  split a full angle at said point into a plurality of angular directions; and
  shoot rays emanating from said point along said directions perpendicular to said level sets.

37. The system according to claim 36, wherein said intrinsic distance is one of the following or an approximation thereof:
  geodesic distance;
  diffusion distance;
  commute time distance; or
  biharmonic distance.

38. The system according to claim 36, wherein said program instructions are further configured to:
  compute weights localized around level sets and rays; and
  compute weighted averages of input data with each of said weights.

39. The system according to claim 21, wherein the averaging operation includes one or more of the following:
  an arithmetic average;
  a maximum operation;
  an average weighted by weights dependent on a distance between points; and
  an average weighted by weights dependent on local volume elements.

40. The system according to claim 21, further comprising program instructions for determining similarity between two geometric objects or for determining correspondence between objects from a class of geometric objects and a reference object.

* * * * *

UNITED STATES PATENT AND TRADEMARK OFFICE
CERTIFICATE OF CORRECTION

PATENT NO. : 10,013,653 B2
APPLICATION NO. : 15/006694
DATED : January 26, 2016
INVENTOR(S) : Michael Bronstein et al.

Page 1 of 1

It is certified that error appears in the above-identified patent and that said Letters Patent is hereby corrected as shown below:

In the Specification

Column 13,
Line 36, "$\sigma_v(\lambda) = \ldots$", should read --$\tau_v(\lambda) = \ldots$--

Column 13,
Line 42, "$\sigma_q(\lambda) = \ldots$", should read --$\tau_q(\lambda) = \ldots$--

Signed and Sealed this
Thirteenth Day of August, 2019

Andrei Iancu
*Director of the United States Patent and Trademark Office*